(12) United States Patent
Moss et al.

(10) Patent No.: US 10,976,714 B2
(45) Date of Patent: Apr. 13, 2021

(54) SYSTEMS AND METHODS FOR EVALUATING SENSOR DATA OF INTERNET-OF-THINGS (IOT) DEVICES AND RESPONSIVELY CONTROLLING CONTROL DEVICES

(71) Applicant: People Power Company, Palo Alto, CA (US)

(72) Inventors: David Michael Moss, Kirkland, WA (US); Dmitry Shirkalin, Richmond Hill (CA); Oleg Leonidovich Zorin, Protvino (RU)

(73) Assignee: People Power Company, Palo Alto, CA (US)

( * ) Notice: Subject to any disclaimer, the term of this patent is extended or adjusted under 35 U.S.C. 154(b) by 60 days.

(21) Appl. No.: 15/666,494

(22) Filed: Aug. 1, 2017

(65) Prior Publication Data

US 2018/0101149 A1    Apr. 12, 2018

Related U.S. Application Data

(60) Provisional application No. 62/535,184, filed on Jul. 20, 2017, provisional application No. 62/405,904, filed on Oct. 8, 2016.

(51) Int. Cl.
*G05B 15/02* (2006.01)
*H04L 29/08* (2006.01)
*H04W 4/70* (2018.01)

(52) U.S. Cl.
CPC ............ *G05B 15/02* (2013.01); *H04L 67/125* (2013.01); *H04W 4/70* (2018.02)

(58) Field of Classification Search
CPC .......... G05B 15/02; H04W 4/70; H04L 67/125
See application file for complete search history.

(56) References Cited

U.S. PATENT DOCUMENTS

| 8,630,741 | B1 | 1/2014 | Matsuoka et al. |
| 2012/0186774 | A1 | 7/2012 | Matsuoka et al. |
| 2013/0006390 | A1* | 1/2013 | Kreft .................... G05B 19/056 700/10 |
| 2014/0317029 | A1 | 10/2014 | Matsuoka et al. |

(Continued)

OTHER PUBLICATIONS

Amayri, Manar, et al., "Estimating Occupancy in Heterogeneous Sensor Environment", Energy and Buildings, vol. 129, 2016 (Year: 2016), pp. 46-58.

*Primary Examiner* — Charles R Kasenge
(74) *Attorney, Agent, or Firm* — Sheppard, Mullin, Richter & Hampton LLP

(57) ABSTRACT

Storing a plurality of cloud-bots, each of the plurality of cloud-bots including a respective service. Gathering first data over a communication network, the first data being associated with a first Internet-of-Things (IoT) device. Gathering second data over the communication network, the second data being associated with a second IoT device. Triggering execution of a particular cloud-bot of the plurality of cloud-bots. Evaluating at least a portion of the first data and at least a portion of the second data against a response condition of a cloud-bot model of the particular cloud-bot. Initiating one or more response actions in response to satisfaction of the response condition, the one or more response actions controlling one or more device actions of a particular IoT device.

20 Claims, 11 Drawing Sheets

(56) References Cited

U.S. PATENT DOCUMENTS

| | | |
|---|---|---|
| 2015/0127712 A1 | 5/2015 | Fadell et al. |
| 2015/0350031 A1 | 12/2015 | Burks et al. |
| 2016/0048114 A1* | 2/2016 | Matthieu ................ G05B 15/02 |
| | | 700/83 |
| 2016/0095189 A1 | 3/2016 | Vangeel et al. |
| 2016/0196131 A1* | 7/2016 | Searle ................... H04L 41/082 |
| | | 717/173 |
| 2016/0202677 A1* | 7/2016 | Trundle ................. G08C 19/16 |
| | | 700/275 |
| 2016/0247370 A1* | 8/2016 | Lamb ..................... G08B 13/08 |
| 2016/0248847 A1* | 8/2016 | Saxena ................... H04L 67/18 |
| 2017/0064550 A1* | 3/2017 | Sundaresan ........... H04W 12/06 |
| 2017/0155703 A1* | 6/2017 | Hao ....................... H04L 67/12 |
| 2017/0238176 A1* | 8/2017 | Garcia Morchon ........................ |
| | | H04L 12/2816 |
| | | 726/7 |
| 2017/0301213 A1 | 10/2017 | Davis et al. |

\* cited by examiner

US 10,976,714 B2

SYSTEMS AND METHODS FOR EVALUATING SENSOR DATA OF INTERNET-OF-THINGS (IOT) DEVICES AND RESPONSIVELY CONTROLLING CONTROL DEVICES

CROSS-REFERENCE TO RELATED APPLICATIONS

The present application claims the benefit of U.S. Provisional Patent Application Ser. No. 62/405,904, filed Oct. 8, 2016 and entitled "Components for Ambient Computing Services," and U.S. Provisional Patent Application Ser. No. 62/535,184, filed Jul. 20, 2017 and entitled "Systems and Methods for Evaluating Sensor Data of Internet-of-Things (IOT) Devices and Responsively Controlling Control Devices," both of which are hereby incorporated by reference herein.

TECHNICAL FIELD

This disclosure pertains to systems for evaluating sensor data of internet-of-things (IoT) devices. More specifically, this disclosure relates to aggregating sensor data associated with disparate IoT devices, normalizing the aggregated sensor data, using cloud-bot(s) to analyze the normalized sensor data, and initiating response actions (e.g., controlling a particular IoT device or other device) based on the analysis.

BACKGROUND

Under conventional approaches, home automation systems provide control, monitoring and automation services. For example, traditional home automation systems may include various IoT devices providing different services such as HVAC control, motion sensing, etc. However, these IoT devices and/or services offer limited support to end users.

SUMMARY

A claimed solution rooted in computer technology overcomes problems specifically arising in the realm of computer technology. In various embodiments, a computing system is configured to aggregate, normalize, and/or integrate disparate IoT data. For example, IoT data may be gathered from disparate IoT devices (e.g., IoT thermostat devices, IoT humidity devices, IoT security devices) associated with different data formats. Data formats may refer to data types, measurements units, file formats, content formats, schemas, programming languages, and/or the like. The gathered IoT data may be normalized and/or integrated (or, "combined") into a common data format (e.g., a normalized data format) and/or common programming language (e.g., a particular domain-specific programming language).

In some embodiments, one or more cloud-bots may be triggered to analyze (or, "evaluate") IoT data (e.g., raw IoT data, normalized IoT data) associated with multiple IoT devices to determine and initiate one or more response actions (e.g., control actions, notification actions). For example, a cloud-bot may receive temperature data detected by one IoT device associated with a particular data format, detect humidity data from a different IoT device associated with a different data format, and determine a likelihood of mold growth based on a combination of the disparate IoT data detected by the different IoT devices. As discussed elsewhere herein, a cloud-bot may include a set of one or more services (e.g., microservices) configured to execute on a cloud-computing platform.

In some embodiments, a cloud-bot may include a model to determine one or more response actions based on a combination of disparate IoT data. This may allow, for example, the cloud-bot to reach a determination that would otherwise not be reached if only the IoT data of one of the IoT devices (e.g., the IoT humidity device, and not the IoT thermostat) was analyzed. Based on the determination, the cloud-bot may initiate a response action. For example, the cloud-bot may initiate a control action (e.g., reduce temperature setting of associated IoT temperature device) and/or a notification action (e.g., provide a text message to a user device).

Various embodiments of the present disclosure include systems, methods, and non-transitory computer readable media configured to store, by a cloud-based system, a plurality of cloud-bots, each of the plurality of cloud-bots including a respective service. First data is gathered, by the cloud-based system, over a communication network, the first data being associated with a first Internet-of-Things (IoT) device. Second data is gathered, by the cloud-based system over the communication network, the second data being associated with a second IoT device. Execution of a particular cloud-bot of the plurality of cloud-bots is triggered. At least a portion of the first data and at least a portion of the second data is evaluated, by the particular cloud-bot of the plurality of cloud-bots in response to the triggering, against a response condition of a cloud-bot model of the particular cloud-bot. One or more response actions are initiated by the particular cloud-bot of the plurality of cloud-bots in response to satisfaction of the response condition, the one or more response actions controlling one or more device actions of a particular IoT device.

In some embodiments, the first IoT device is associated with a first manufacturer entity, and the second IoT device is associated with a second manufacturer entity different from the first manufacturer entity. In related embodiments, the first data is received from a first cloud-based IoT back-end system associated with the first manufacturer entity, and the second data is received from a second cloud-based IoT back-end system different from the first cloud-based IoT back-end system, the second cloud-based IoT back-end system being associated with the second manufacturer entity.

In some embodiments, the particular IoT device comprises the first IoT device or the second IoT device.

In some embodiments, the particular IoT device is different from the first IoT device and the second IoT device.

In some embodiments, the cloud-bot model receives the at least a portion of the first data as a first input and the at least a portion of the second data as a second input, the cloud-bot model identifying a relationship between the first input and the second input, the relationship causing a satisfaction of the response condition.

In some embodiments, the combination of the at least a portion of the first data and the at least a portion of the second data is sufficient to satisfy the response condition, wherein independently the at least a portion of the first data and the at least a portion of the second data fail to satisfy the response trigger condition.

In some embodiments, the first IoT device and the second IoT device belong to a user of a first account, and the particular IoT device is a control device of a user of a different account.

In some embodiments, the cloud-bot is configured to monitor for false positives of a door sensor.

In some embodiments, the response condition includes a factor based on a phoneless geofence.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
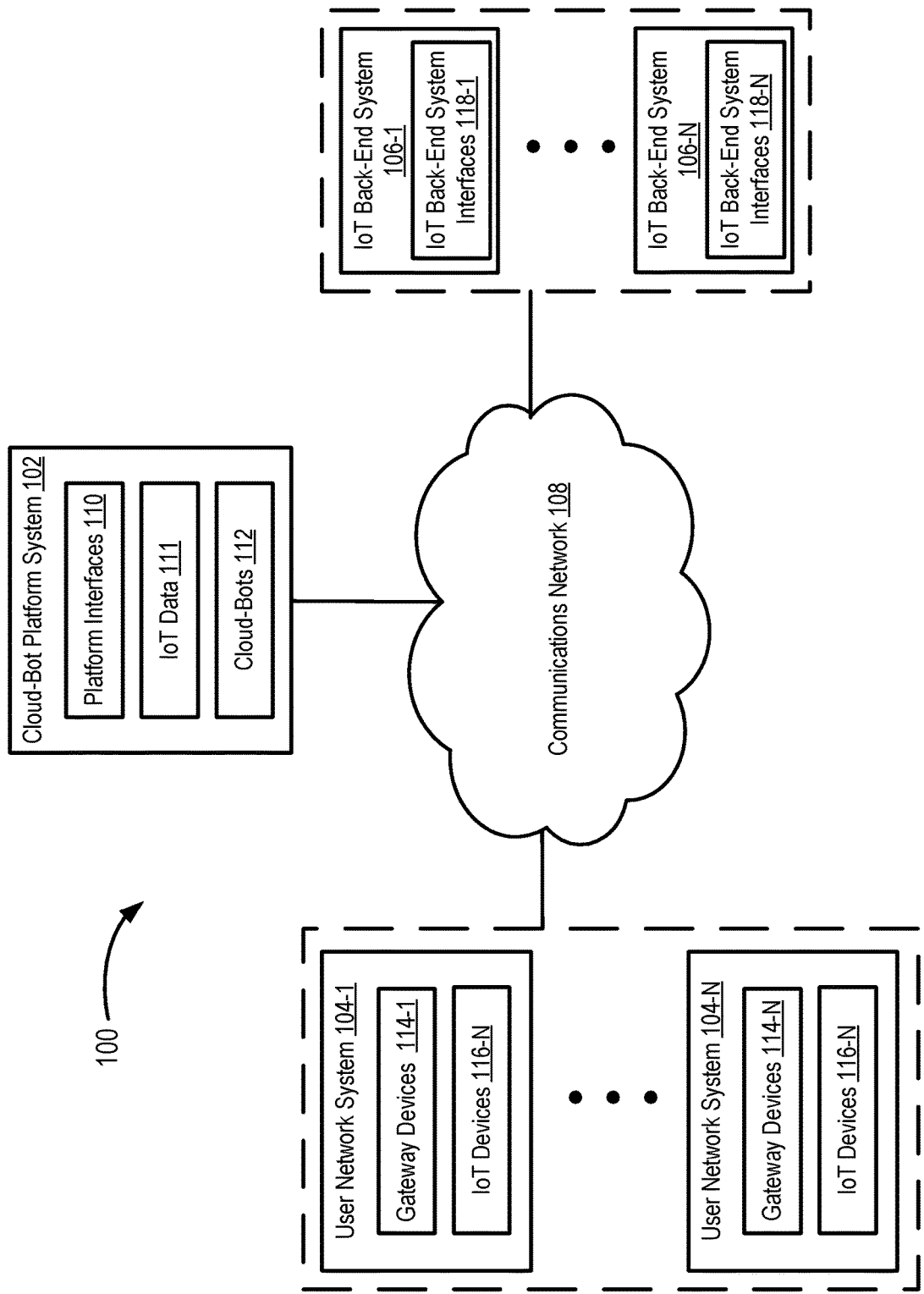
FIG. 1 depicts a diagram of an example environment for deployment and operation of cloud-bots for analyzing disparate IoT data and initiating response actions based thereon according to some embodiments.

Internet-of-Things (IoT) devices may be embedded with electronics, software, sensors, controllers, and communications which allow the IoT devices to detect, transmit, and receive information. For example, an IoT thermostat (e.g., a Nest thermostat device) may monitor sensor data (e.g., temperature data), use circuitry to activate the HVAC system, and communicate the sensor data in a particular format (e.g., a Nest-specified format) to an IoT back-end system (e.g., a Nest cloud-based server system). Similarly, an IoT humidity device (e.g., a Honeywell IoT humidity device) may monitor sensor data (e.g., humidity data), use circuitry to control a humidifier/dehumidifier, and communicate the sensor data in a particular format (e.g., a Honeywell-specified format) to a IoT back-end system (e.g., a Honeywell cloud-based server system). Traditional solutions (e.g., Nest, Honeywell) can independently act on the respective data received from the IoT devices. For example, a Nest back-end system may generate a report on data collected from Nest IoT devices, and a Honeywell back-end system may generate a report on data collected from Honeywell IoT devices.

Embodiments of the current system are capable of evaluating and reacting to sensor data across a combination of disparate IoT devices (e.g., Nest IoT devices and Honeywell IoT devices) of disparate manufacturers, sensor data involving disparate types of IoT devices (e.g., smart thermostats and motion sensor cameras), etc. The current system is capable of changing responsive conditions to address changing environments, risk/threat levels, user preferences/instructions, etc.

A claimed solution rooted in computer technology overcomes problems specifically arising in the realm of computer technology. In various embodiments, a computing system is configured to aggregate, normalize, and/or integrate disparate IoT data. For example, IoT data may be gathered from disparate IoT devices (e.g., IoT thermostat devices, IoT humidity devices, IoT security devices) associated with different data formats. Data formats may refer to data types, measurement units, file formats, content formats, schemas, programming languages, and/or the like. The gathered IoT data may be normalized and/or integrated (or, "combined") into a common data format (e.g., a normalized data format) and/or common programming language (e.g., a particular domain-specific programming language).

In some embodiments, one or more cloud-bots may be triggered to analyze (or, "evaluate") IoT data (e.g., raw IoT data, normalized IoT data) associated with multiple IoT devices to determine and initiate one or more response actions (e.g., control actions, notification actions). For example, a cloud-bot may receive temperature data detected by one IoT device associated with a particular data format, detect humidity data from a different IoT device associated with a different data format, and determine a likelihood of mold growth based on a combination of the disparate IoT data detected by the different IoT devices. As discussed elsewhere herein, a cloud-bot may include a set of one or more services (e.g., microservices) configured to execute on a cloud-computing platform.

In some embodiments, a cloud-bot may include a model to determine one or more response actions based on a combination of disparate IoT data. This may allow, for example, the cloud-bot to reach a determination that would otherwise not be reached if only the IoT data of one of the IoT devices (e.g., the IoT humidity device, and not the IoT thermostat) was analyzed. Based on the determination, the cloud-bot may initiate a response action. For example, the cloud-bot may initiate a control action (e.g., reduce temperature setting of a control device of an associated IoT smart thermostat) and/or a notification action (e.g., provide a text message to a user device).

FIG. 1 depicts a diagram 100 of an example environment for deployment and operation of cloud-bots 112 for analyzing disparate IoT data 111 and initiating response actions based thereon according to some embodiments. In the example of FIG. 1, the environment includes a cloud-bot platform system 102, user network systems 104-1 to 104-N (individually, the user network system 104, collectively, the user network systems 104), IoT back-end systems 106-1 to 106-N (individually, the IoT back-end system 106, collectively, the IoT back-end systems 106), and a communication network 108.

The cloud-bot platform system 102 may function to gather, aggregate, store, and/or normalize IoT data 111. In various embodiments, functionality of the cloud-bot platform system 102 may be performed by one or more servers, cloud-computing platform, and/or other computing devices. A cloud-computing platform may refer to an on-demand cloud-computing platform, a "serverless" cloud-computing platform, and/or other cloud-computing platform. It will be appreciated that a "serverless" cloud-computing platform may dynamically manage allocation of computing resources, and may still require servers.

In some embodiments, the IoT data 111 may include sensor data (e.g., temperature data, humidity data) detected by IoT devices (e.g., IoT device 116, discussed herein). The cloud-bot platform system 102 may utilize one or more platform interfaces 110 to gather IoT data 111 from one or more remote sources in real-time and/or otherwise (e.g., periodically, according to a schedule, or in response to particular events). The platform interfaces 110 may include application programming interfaces (APIs), software development kits (SDKs), source code, machine code, and/or server stubs. Accordingly, the platform interfaces 110 may include files (e.g., source code files), documents, executables, and/or the like. In some embodiments, the platform interfaces 110 facilitate interaction with remote systems (e.g., user network systems 104, gateway devices 114, IoT devices 116, IoT back-end systems 106). The platform interfaces 110 may, for example, include server API implementations.

In one example, the cloud-bot platform system 102 may utilize a first set of platform interfaces 110 to gather IoT data 111 from IoT back-end systems 106, a second set of platform interfaces 110 to gather IoT data 111 from gateway devices (e.g., gateway devices 114, discussed herein), and/or a third set of platform interfaces 110 to gather IoT data 111 from IoT devices 116.

In some embodiments, the cloud-bot platform system 102 functions to execute cloud-bots 112. A cloud-bot 112 may include a service (e.g., microservice) and/or set of services. A cloud-bot 112 may include one or more cloud-bot models. For example, cloud-bot models may be static (e.g., "baked" into the service and/or set of services) and/or dynamic (e.g., updated, deleted, and/or otherwise modified prior to, or during, execution of the associated cloud-bot 112). In one example, a cloud-bot model may receive various independent inputs (e.g., temperature data detected by an IoT thermostat device 116, humidity data detected by an IoT humidity device 116) and determine (e.g., "map") relationships between the various independent inputs. The mapped relationships may, for example, allow a cloud-bot 112 to identify conditions (e.g., likelihood of mold growth) and/or initiate response actions (e.g., reduce temperature of an IoT device) that would otherwise not be possible. For example, a cloud-bot 112 may evaluate mapped inputs against a response condition of the cloud-bot model to determine that one or more response actions should be initiated (e.g., reduce temperature of an IoT device), where separate evaluations of the independent inputs would yield a different determination (e.g., no action needed).

In some embodiments, the cloud-bot platform system 102 facilities on-demand execution of cloud-bots 112. For example, the cloud-bot platform system 102 may deploy a cloud-bot 112 (e.g., within a user account of the cloud-bot platform system 102). A deployed cloud-bot 112 may have several different modes, such as a sleep mode and/or an execute mode. While a cloud-bot 112 is in sleep mode, and/or in any other state (e.g., a non-deployed state), the cloud-bot 112 and/or the cloud-bot platform system 102 may listen for various execution triggers that may trigger the execute mode (e.g., transition from sleep to execute and/or deploy a cloud-bot 112 and execute the cloud-bot). While in execute mode, the cloud-bot 112 may perform execution actions, such as evaluating IoT data 111, determining response actions, initiating response actions, and/or the like. Once the execution actions are completed, or other termination trigger (e.g., a terminate message received from a user device) is detected, the cloud-bot 112 may terminate. In various embodiments, terminating a cloud-bot 112, or terminating execution of a cloud-bot 112, may refer to returning the cloud-bot 112 to sleep mode and/or otherwise quitting execution of the cloud-bot 112 (e.g., shutting down and/or restarting the cloud-bot 112). On-demand execution of cloud-bots 112 may, for example, conserve computing resources.

In some embodiments, the cloud-bot platform system 102 functions to store cloud-bot variables. For example, cloud-bot variables may include variables, objects, parameters, attributes, and/or the like. Cloud-bot variables may store information (e.g., state information) output from one execution of a cloud-bot 112 for utilization in subsequent executions of the same and/or different cloud-bots 112. For example, an IoT security cloud-bot 112 may arm an IoT security device 116 in response to sensor data indicating that a building is empty, and the IoT security cloud-bot 112 may export the state of the IoT security device 116 (e.g., armed) upon, or prior to, termination of the cloud-bot 112. This may allow, for example, cloud-bots 112 to be executed on-demand and terminated without sacrificing functionality (e.g., the ability to save/load information across different executions of cloud-bots 112).

The user network systems 104 may function to provide respective local area networks (LANs), wide-area networks (WANs) and/or other networks including IoT devices 116. The user network systems 104, and the IoT devices 116, may be coupled to the communication network 108 through respective gateway devices 114. For example, the gateway devices 114 may include Wi-Fi routers, modems, and/or the like. In some embodiments, the IoT devices 116 may be directly coupled to the communication network 108 (e.g., via a cellular signal). In some embodiments, groups of user network systems 104 may form "communities" of user network systems 104. In various embodiments, functionality of the user network systems 104 may be performed by one or more gateway device 114, IoT devices 116, desktop computers, laptop computers, mobile devices (e.g., smartphones, tablet computers), servers, and/or other computing devices.

As discussed elsewhere herein, the IoT devices 116 may include a variety of different types of IoT devices 116, such as IoT thermostat devices 116 (e.g., Nest IoT thermostat devices 116), IoT humidity devices 116 (e.g., Honeywell IoT humidity devices 116), IoT security devices 116 (e.g., ADT Pulse IoT devices 116), and/or the like. In some embodiments, the IoT devices 116 may include sensors (e.g., temperature sensors, humidity sensors, cameras, microphones), controllers (e.g., actuators that may be intelligently and/or dynamically controlled), communications (e.g., WiFi transceivers, cellular transceivers), and/or the like. The IoT devices 116 may detect sensor data (e.g., IoT data) in a particular data format, store sensor data, provide sensor data to remote systems, and perform control actions in response to control instructions received from remote systems. In various embodiments, an IoT device 116 may refer to a collection of devices forming a particular device (e.g., an IoT Television), and/or it may refer to one or more devices (e.g., a communication component) of a particular device (e.g., an IoT television).

The IoT back-end systems 106 may function to receive, store, and/or provide IoT data detected by associated IoT devices 116. For example, an IoT back-end system 106 associated with a particular manufacturer entity (e.g., Nest) may receive, store, and/or provide IoT data detected by Nest IoT devices 116, another IoT back-end system 106 associated with a different manufacturer entity (e.g., Honeywell) may receive, store and/or provide IoT data detected by Honeywell IoT devices 116, and so forth. In various embodiments, some or all of the IoT back-end systems 106 may be associated with different data formats (e.g., Nest IoT data may be stored according to a different schema than Honeywell IoT data). In some embodiments, functionality of the IoT back-end systems 106 may be performed by one or more servers (e.g., cloud-based servers) and/or other computing devices.

In some embodiments, the IoT back-end systems 106 may function to communicate cooperate, and/or interact with remote systems (e.g., cloud-bot platform system 102, user network systems 104, gateway devices 114, and/or IoT devices 116). For example, the IoT back-end systems 106 may utilize IoT back-end interfaces 118 to facilitate communication, cooperation, and/or interaction with remote systems. The IoT back-end system interfaces 118 may include APIs (e.g., server APIs, client APIs), code (e.g., source code, byte code, or machine code), and/or the like.

The communications network 108 may represent one or more computer networks (e.g., LAN, WAN, or the like) or other transmission mediums. The communication network 108 may provide communication between systems 102-106 and/or other systems described herein. In some embodiments, the communication network 108 includes one or more computing devices, routers, cables, buses, and/or other network topologies (e.g., mesh, and/or the like). In some embodiments, the communication network 108 may be wired and/or wireless. In various embodiments, the communication network 108 may include the Internet, one or more networks that may be public, private, IP-based, non-IP based, and/or the like.

Figure 2:
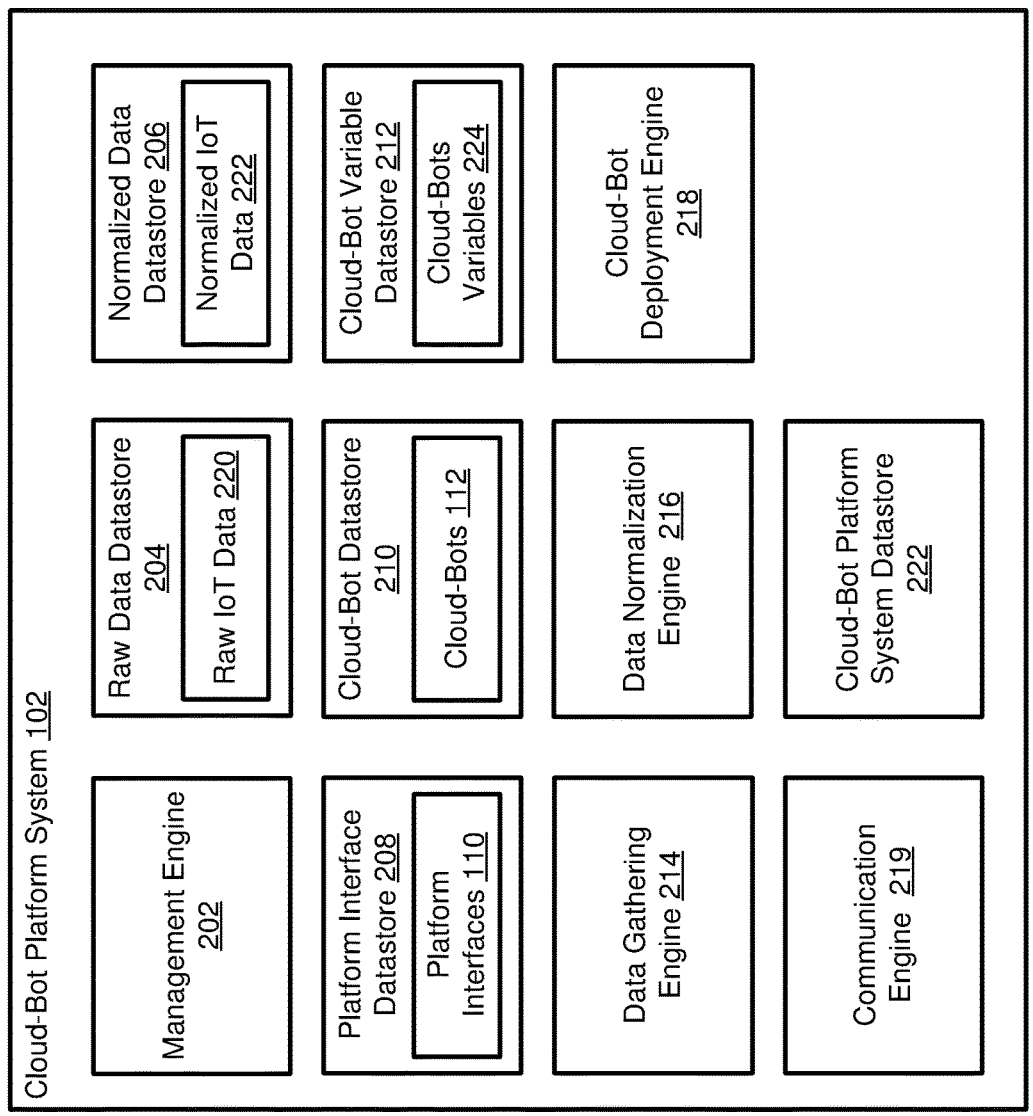
FIG. 2 depicts a diagram of an example of a cloud-bot platform system according to some embodiments.

FIG. 2 depicts a diagram 200 of an example of a cloud-bot platform system 102 according to some embodiments. In the example of FIG. 2, the cloud-bot platform system 102 includes a management engine 202, a raw data datastore 204, a normalized data datastore 206, a platform interface datastore 208, a cloud-bot datastore 210, a cloud-bot variable datastore 212, a data gathering engine 214, a data normalization engine 216, a cloud-bot deployment engine 218, a communication engine 219, and a cloud-bot platform system datastore 222.

The management engine 202 may function to manage (e.g., create, read, update, delete, or otherwise access) raw IoT data 220 stored in the raw data datastore 204, normalized data stored in the normalized data datastore 206, platform interfaces 110 stored in the platform interface datastore 208, cloud-bots 112 stored in the cloud-bot datastore 210, cloud-bot variables 224 stored in the cloud-bot variable datastore 212, and/or other data stored in other datastores (e.g., the cloud-bot platform system datastore 222). The management engine 202 may perform any of these operations manually (e.g., by a user interacting with a GUI) and/or automatically (e.g., triggered by one or more of the engines 214-220, discussed herein). In some embodiments, the management engine 202 includes a library of executable instructions, which are executable by one or more processors for performing any of the aforementioned management operations. Like other engines described herein, functionality of the management engine 202 may be included in one or more other engines (e.g., engines 214-220).

The raw IoT data 220 may include IoT data formatted according to a raw (or, "origin") data format (e.g., a data format associated with an IoT device 116, or a data format associated with an IoT back-end system 106). In some examples, raw IoT data 220 may include tabular schema formatted data, object-oriented schema formatted data, and/or the like. For example, raw IoT data 220 may include data retrieved from IoT devices, database systems, data services, and/or the like. In some embodiments, the raw IoT data 220 may mirror raw IoT data of a source system. In order to maintain an update-to-date mirror, the raw IoT data 220 may be refreshed periodically and/or in real-time.

The normalized IoT data 222 may include data that has been normalized, and/or otherwise transformed, any number of times. For example, the normalized IoT data 222 may be raw IoT data 220 that has been normalized to a particular data format. In some embodiments, normalized IoT data 222 includes raw IoT data 220 that has been normalized to a normalized data format, which may allow, for example, the raw IoT data 220 to be obtained from disparate IoT data sources and maintained in the normalized data datastore 206 with a common data format (e.g., normalized data format).

The data gathering engine 214 may function to gather raw IoT data 220. For example, the data gathering engine 214 may implement one or more platform interfaces 110 to obtain raw IoT data 220 from gateway devices 114, IoT devices 116, and/or IoT back-end systems 106. Gathered raw IoT data 220 may be stored in the raw data datastore 204.

The data normalization engine 216 may function to generate normalized IoT data 222 from the raw IoT data 220. In some embodiments, the data normalization engine 216 may normalize the raw IoT data 220 based on one or more normalization rules. For example, the normalization rules may include functions to transform raw IoT data 220 from a particular data format to a normalized data format, and/or functions to standardize different raw IoT data 220 values and/or values ranges. In some embodiments, the data normalization engine 216 may generate raw IoT data 220 from normalized IoT data 222, and/or generate raw IoT device functions (or, "commands") from normalized IoT functions.

The cloud-bot deployment engine 218 may function to deploy cloud-bots 112 to user accounts of the cloud-bot platform system 102. In some embodiments, cloud-bots 112 may be deployed in response to user input. For example, a user may select one or more cloud-bots 112 from a library of cloud-bots 112 (e.g., stored in the cloud-bot datastore 210), and the cloud-bot deployment engine 218 may deploy the one or more cloud-bots 112 to that user's account. In various embodiments, the cloud-bot deployment engine 218 dynamically manages allocation of computing resources associated with deployed cloud-bots 112.

In some embodiments, the cloud-bot deployment engine 218 deploys cloud-bots 112 non-disruptively. For example, the cloud-bot deployment engine 218 may deploy a cloud-bot 112 to a user's account without having to restart or otherwise interfere with operation of the cloud-bot platform system 102.

In some embodiments, the cloud-bot deployment engine 218 triggers and/or executes cloud-bots 112. Accordingly, the cloud-bot deployment engine 218 may include some or all of the functionality of the cloud-bots 112 discussed herein (e.g., the example cloud-bot 112 discussed below with reference to FIG. 3). For example, the cloud-bot deployment engine 218, and/or other component(s) of the cloud-bot platform system 102, may include the functionality of the trigger engine 302 (discussed below), cloud-bot execution engine 304 (discussed below), and/or the like.

In some embodiments, the cloud-bot deployment engine 218 may deploy and/or execute cloud-bots 112 within a Virtual Private Cloud (VPC). This may, for example, protect various computing resources (e.g., servers) and/or data (e.g., user data, raw IoT data 220, normalized IoT data 222) by inhibiting communications between cloud-bots 112 and third-party systems. In some embodiments, the cloud-bots 112 may be able to communicate with third-party systems (e.g., as long as they have been properly reviewed).

The communication engine 219 may function to send requests, transmit and, receive communications, and/or otherwise provide communication with one or a plurality of systems. In some embodiments, the communication engine 219 functions to encrypt and decrypt communications. The communication engine 219 may function to send requests to and receive data from one or more systems (e.g., gateway devices 114, IoT devices 116, IoT back-end systems 106) through a network or a portion of a network. Depending upon implementation-specified considerations, the communication engine 219 may send requests and receive data through a connection, all or a portion of which may be a wireless connection. The communication engine 219 may request and receive messages, and/or other communications from associated systems. Communications may be stored at least temporarily (e.g., cached and/or persistently) in the cloud-bot platform system datastore 222.

Figure 3:
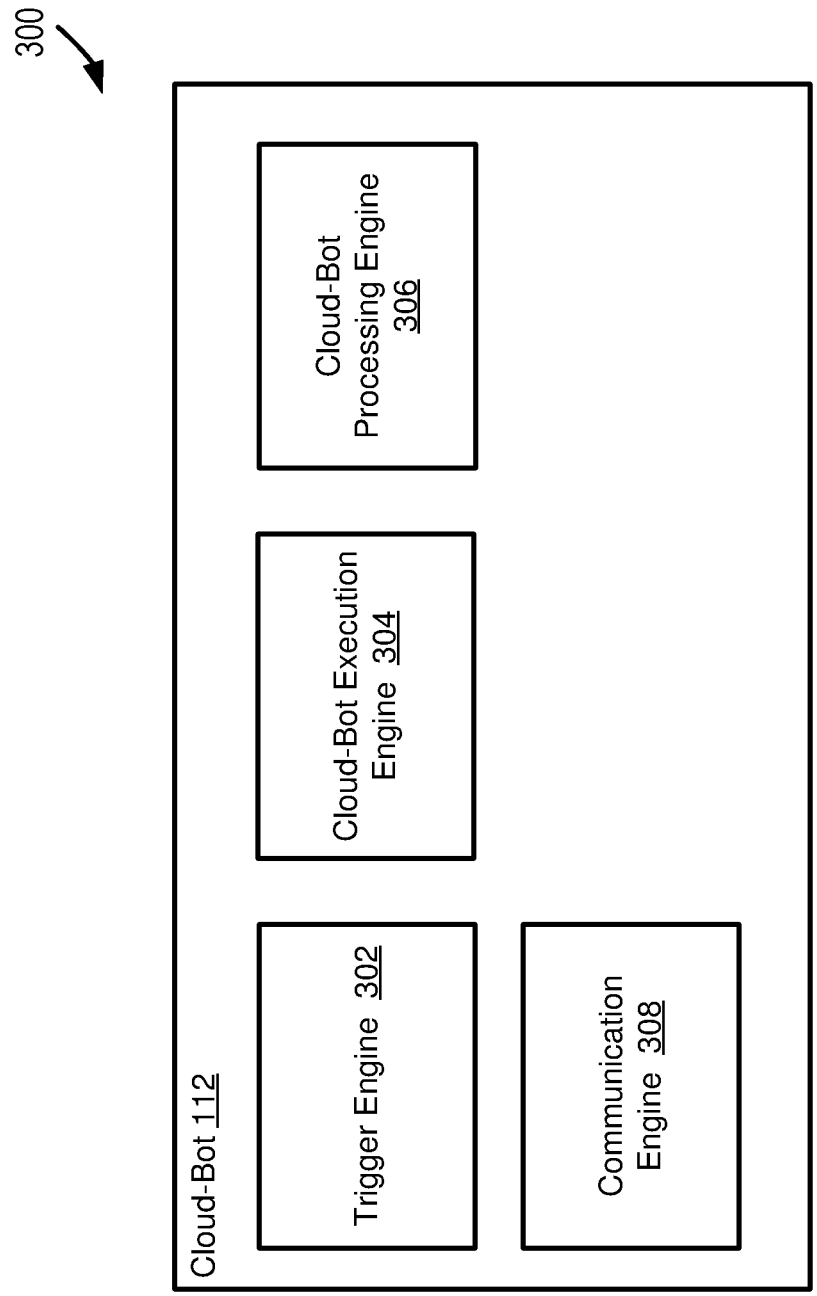
FIG. 3 depicts a diagram of an example of a cloud-bot according to some embodiments.

FIG. 3 depicts a diagram 300 of an example of a cloud-bot 112 according to some embodiments. In the example of FIG. 3, the cloud-bot 112 includes a trigger engine 302, a cloud-bot execution engine 304, a cloud-bot processing engine 306, and a communication engine 308.

The trigger engine 302 may function to schedule and/or define execution triggers. In some embodiments, the trigger engine 302 searches and/or determines cloud-bots 112 to execute (e.g., based on cloud-bot 112 definitions). In some embodiments, execution triggers may include some or all of the following:

Scheduled Execution Triggers: trigger execution of cloud-bots 112 in response to predetermined time-based triggers (e.g., every hour, day, month). For example, scheduled execution triggers may be implemented as one or more Cron expressions.

Manual Execution Triggers: manually trigger execution of cloud-bot 112. For example, a user may manually trigger execution of cloud-bots.

Location Trigger: trigger execution of cloud-bots 112 in response to a change in physical location (e.g., a user leaving a building) and/or virtual location (e.g., an "away" location or "home" location).

Device Alert Triggers: trigger execution of cloud-bots 112 in response to measurements, alerts and/or other messages provided by IoT devices 116, cloud-bots 112 and/or other devices/systems. For example, image data detected by a camera device may trigger a security cloud-bot 112, temperature data and humidity data detected by IoT thermostat devices 116 and IoT humidity devices 116 may trigger a mold detection cloud-bot 112. The device alert triggers may also analyze IoT data and/or conditions to determine whether to execute and/or terminate a cloud-bot 112.

Question Triggers: trigger cloud-bots 112 in response to user answers provided in response to questions presented to a user by cloud-bots 112. For example, a motion sensor of an IoT security device 116 may detect motion in the basement of the user's home, and the cloud-bot 112 may present a question to the user (e.g., "Should anyone be in the basement?"), and based on the answer (e.g., "No"), the cloud-bot 112 may be triggered.

Timer Triggers: trigger cloud-bots 112 in response to automatically and/or manually set countdown timers. For example, a cloud-bot 112 may set itself (or the cloud-bot platform system 102 may set the cloud-bot 112) to be triggered (e.g., 2 minutes after the user exits his home) based on communication with a user (e.g., via answering questions presented through a question). In another example, a security cloud-bot 112 may set a predetermined timer (e.g., 2 minutes) for arming itself upon determining that a building is empty. This may, for example, allow a user to re-enter the building within that predetermined amount of time without triggering an alarm.

Missing

Device File Uploads: Cloud-bot 112 may be triggered based on transmitted and/or received uploads (e.g., a video or picture is captured and uploaded to the cloud, which then triggers the bot to execute to process this media).

Initial Cloud-Bot Instance Deployment: when a cloud-bot 112 gets deployed or upgraded, all instances of that cloud-bot 112 may get triggered to execute any code necessary to transition into a new version of the cloud-bot 112.

The cloud-bot execution engine 304 may function to trigger execution of cloud-bots 112 (e.g., transition from sleep mode to execute mode) and/or trigger termination of the cloud-bot 112 (e.g., transition from execute mode to sleep mode). The cloud-bot execution engine 304 may trigger execution of the cloud-bot 112 in response to execution triggers defined by the trigger engine 302. For example, the cloud-bot execution engine 304 may listen for one or more execution triggers, and trigger execution upon detecting an execution trigger.

In some embodiments, the cloud-bot execution engine 304 defines which execution triggers to listen for, which values and/or types of data/conditions to listen for, and which IoT devices 116 to listen to. For example, a mold-growth cloud-bot 112 may listen for information received from IoT thermostat devices 116 and IoT humidity devices 1116, while a security cloud-bot 112 may listen for information received from IoT camera devices 116 and IoT motion sensor devices 116.

The cloud-bot processing engine 306 may function to load and/or evaluate cloud-bot inputs (e.g., normalized IoT data 222 and/or cloud-bot variables 224). In some embodiments, the cloud-bot processing engine 306 may evaluate cloud-bot inputs against one or more response conditions. For example, a response condition may include one or more threshold conditions (e.g., threshold temperatures, threshold humidity levels) and/or types of raw IoT data (e.g., camera images), that when satisfied, cause the cloud-bot processing 306 to initiate response actions. Response actions may include control actions and/or notification actions. Control actions may include control instructions for controlling one or more devices (e.g., IoT devices 116, and notification actions may include electronic message notifications (e.g., text messages, email messages, audio message, visual messages, haptic messages).

In some embodiments, the cloud-bot processing engine 306 may execute cloud-bot models to evaluate cloud-bot inputs against response conditions. For example, a response condition may include a threshold score (e.g., a threshold score indicating a likelihood of mold growth). The cloud-bot processing engine 306 may determine a current score based on a combination of input values (e.g., normalized IoT temperature data 222, normalized IoT humidity data 222). The cloud-bot model may map relationships between the cloud-bot inputs, and based on the mapped relationships, the cloud-bot processing engine 306 may calculate the current score. The cloud-bot processing engine 306, using the cloud-bot model, may compare the current score against the threshold score. Based on the comparison (e.g., if the current score exceeds the threshold score), the cloud-bot processing engine 306 may initiate a response action (e.g., reduce temperature of IoT thermostat device 116 and/or notify a user).

In some embodiments, the response actions may include modifying execution trigger(s) and/or response conditions of the cloud-bot 112. For example, the cloud-bot processing engine 306 may increase the frequency of scheduled execution triggers (e.g., from every day to every hour), add additional execution triggers, remove execution triggers, and/or the like. In some embodiments, a level of modification and/or level of the response actions may be variable. For example, a security cloud-bot may activate additional motions sensors in response to a low-level threat (e.g., one door sensor triggered within a predetermined period of time), or it may trigger an alarm and/or notify a security entity in response to a high-level threat (e.g., multiple motion sensor triggered within a predetermined period of time).

In some embodiments, the cloud-bot processing engine 306 may evaluate cloud-bot inputs against multiple response conditions (e.g., satisfaction of one response condition may trigger an evaluation of one or more additional conditions, and so forth). For example, if a door sensor indicates a door is open, that may trigger an evaluation of living room motion sensor data, which may result in triggering an alarm.

In some embodiments, the cloud-bot processing engine 306 may terminate execution of cloud-bots 112 and/or export cloud-bot variables 224. For example, the cloud-bot processing engine 306 may terminate execution of a cloud-bot 112 after evaluation of cloud-bot inputs and/or initiation of response actions. The cloud-bot processing engine 306 may export cloud-bot variables 224 upon termination, or prior to termination, of the execution of the cloud-bot 112.

The communication engine 308 may function to send requests, transmit and, receive communications, and/or otherwise provide communication with one or a plurality of systems. In some embodiments, the communication engine 308 functions to encrypt and decrypt communications. The communication engine 308 may function to send requests to and receive data from one or more systems (e.g., cloud-bot platform system 102, gateways devices 114, IoT devices 116, IoT back-end systems 106) through a network or a portion of a network. Depending upon implementation-specified considerations, the communication engine 308 may send requests and receive data through a connection, all or a portion of which may be a wireless connection. The communication engine 308 may request and receive messages, and/or other communications from associated systems. For example, the communication engine may receive cloud-bot inputs (e.g., raw data, normalized data, cloud-bot variables) and/or export cloud-bot outputs (e.g., response action data, cloud-bot variables).

Figure 4:
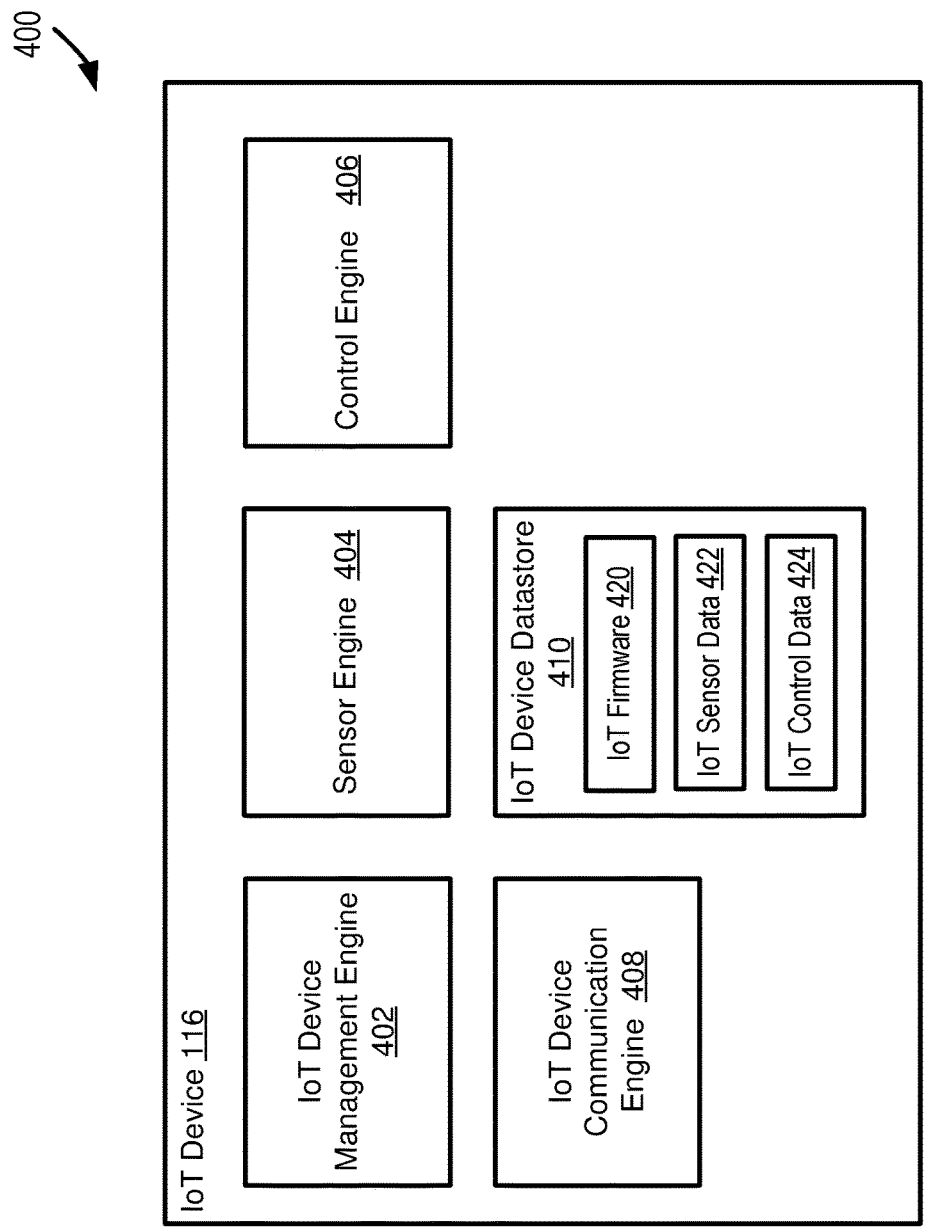
FIG. 4 depicts a diagram of an example of an IoT device according to some embodiments.

FIG. 4 depicts a diagram 400 of an example of an IoT device 116 according to some embodiments. In the example of the FIG. 4, the IoT device 116 includes an IoT device management engine 402, a sensor engine 404, a control engine 406, an IoT device communication engine 408, and an IoT device datastore 410.

The IoT device management engine 402 may function to manage (e.g., create, read, update, delete, or otherwise access) IoT firmware 420 stored in the IoT device datastore 410, IoT sensor data 422 stored in the IoT device datastore 410, and/or the IoT control data 424 stored in the IoT device datastore 410. The IoT device management engine 402 may perform any of these operations manually (e.g., by a user interacting with a GUI) and/or automatically (e.g., triggered by one or more of the engines 404-408, discussed herein). In some embodiments, the IoT device management engine 402 includes a library of executable instructions, which are executable by one or more processors for performing any of the aforementioned management operations.

The sensor engine 404 may function to detect IoT sensor data 422. For example, the sensor engine 404 may detect raw IoT sensor data 422 using one or more physical sensors (e.g., temperature sensors, humidity sensors, motion sensors, cameras, microphones). In some embodiments, the IoT sensor data 422 may be stored, at least temporarily, in the IoT device datastore 410.

The control engine 406 may function to perform control actions. For example, control actions may include adjusting temperature, locking and/or unlocking doors, video recording, and/or the like. Control actions may be performed based on response actions initiated by remote systems (e.g., a cloud-bot 112). Results of control actions (e.g., door unlocked) may be stored as IoT control data 424 in the IoT device datastore 410.

The IoT device communication engine 408 may function to send requests, transmit and, receive communications, and/or otherwise provide communication with one or a plurality of systems. In some embodiments, the IoT device communication engine 408 functions to encrypt and decrypt communications. The IoT device communication engine 408 may function to send requests to and receive data from one or more systems (e.g., cloud-bot platform system 102, gateway devices 114, IoT back-end systems 106) through a network or a portion of a network. Depending upon implementation-specified considerations, the IoT device communication engine 408 may send requests and receive data through a connection, all or a portion of which may be a wireless connection. The IoT device communication engine 408 may request and receive messages, and/or other communications from associated systems. For example, the communication engine may receive IoT firmware 420 updates, provide IoT sensor data 422, receive IoT control data 424, and/or the like.

The IoT firmware 420 may function to provide control, monitoring, communication, and/or data manipulation for the IoT device 116. In some embodiments, the IoT firmware 420 may function to facilitate communication, cooperation, and/or interaction with remote systems (e.g., gateway devices 114, cloud-bot platform system 102, IoT back-end systems 106). For example, the IoT firmware 420 may interact with a platform interface 110 to provide communication between the IoT device 116 and the cloud-bot platform system 102 through the communication network 108.

Figure 5:
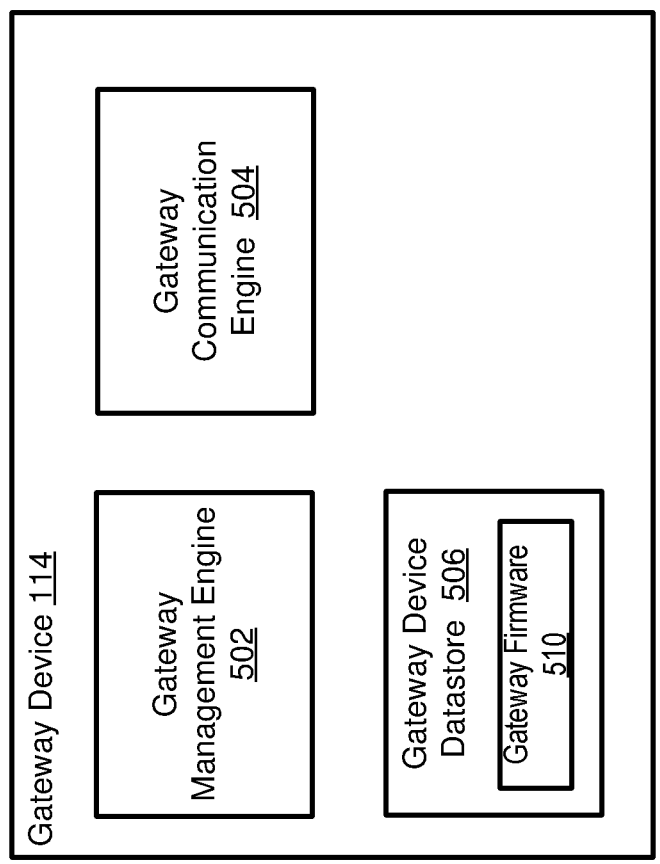
FIG. 5 depicts a diagram of an example of a gateway device according to some embodiments.

FIG. 5 depicts a diagram 500 of an example of a gateway device 114 according to some embodiments. In the example of FIG. 5, the gateway device 114 includes a gateway management engine 502, a gateway communication engine 504, and a gateway device datastore 506.

The gateway management engine 502 may function to manage (e.g., create, read, update, delete, or otherwise access) gateway firmware 510 stored in the gateway device datastore 508. The gateway management engine 502 may perform any of these operations manually (e.g., by a user interacting with a GUI) and/or automatically (e.g., triggered by the gateway communication engine 504, discussed herein). In some embodiments, the gateway management engine 502 includes a library of executable instructions, which are executable by one or more processors for performing any of the aforementioned management operations.

The gateway firmware 510 may function to provide control, monitoring, communication, and/or data manipulation for the gateway device 114. In some embodiments, the gateway firmware 510 may function to facilitate communication, cooperation, and/or interaction with remote systems (e.g., IoT devices 116, cloud-bot platform system 102, IoT back-end systems 106). For example, the gateway firmware 510 may interact with a platform interface 110 to provide communication between the IoT devices 116 and the cloud-bot platform system 102 through the communication network 108.

The gateway communication engine 504 may function to facilitate network connectivity (e.g., Wi-Fi) between IoT devices 116 and one or more remote systems (e.g., cloud-bot platform system 102 and/or IoT back-end systems 106). In some embodiments, the gateway communication engine 504 may send requests, transmit and, receive communications, and/or otherwise provide communication with one or a plurality of systems. In some embodiments, the gateway communication engine 504 functions to encrypt and decrypt communications. The gateway communication engine 504 may function to send requests to and receive data from one or more systems (e.g., cloud-bot platform system 102, IoT device 116, IoT back-end systems 106) through a network or a portion of a network. Depending upon implementation-specified considerations, the gateway communication engine 504 may send requests and receive data through a connection, all or a portion of which may be a wireless connection. The gateway communication engine 504 may request and receive messages, and/or other communications from associated systems.

Figure 6:
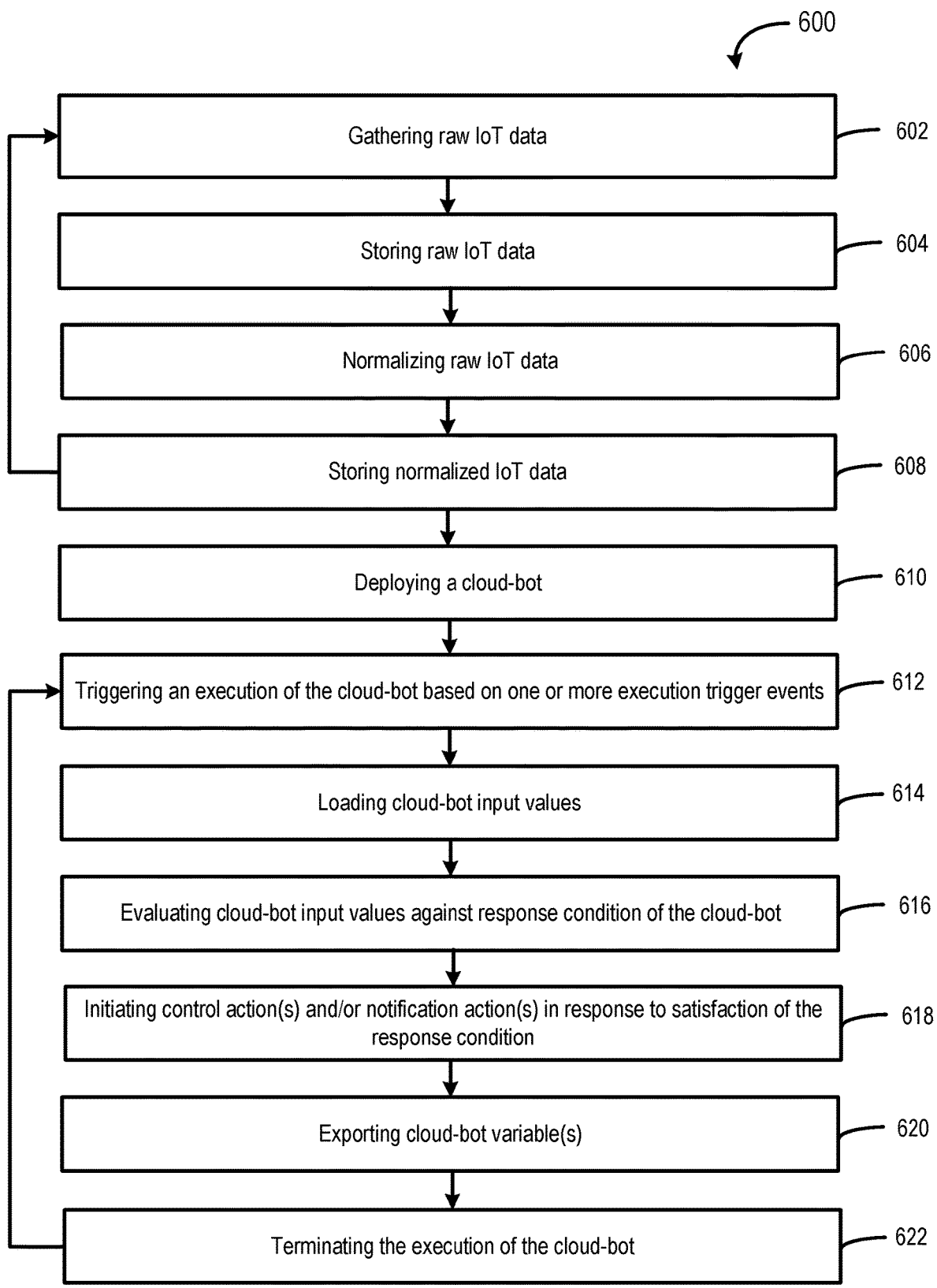
FIG. 6 depicts a flowchart of an example of a method of deployment and operation of a cloud-bot according to some embodiments.

FIG. 6 depicts a flowchart 600 of an example of a method of deployment and operation of a cloud-bot (e.g., cloud-bot 112) according to some embodiments. In this and other flowcharts, the flowchart illustrates by way of example a sequence of steps. It should be understood the steps may be reorganized for parallel execution, or reordered, as applicable. Moreover, some steps that could have been included may have been removed for the sake of clarity and some steps that were included could be removed, but may have been included for the sake of clarity.

In step 602, a cloud-bot platform system (e.g., cloud-bot platform system 102) gathers raw IoT data (e.g., raw IoT data 220). For example, the cloud-bot platform system may gather raw IoT data from one or more IoT back-end systems (e.g., IoT back-end systems 106), gateway devices (e.g., gateway devices 114), and/or IoT devices (e.g., IoT devices 116). In some embodiments, a data gathering engine (e.g., data gathering engine 214) gathers the raw IoT data. The data gathering engine may utilize one or more platform interfaces (e.g., platform interfaces 110 stored in the platform interface datastore 208) to interact with the one or more IoT back-end systems, gateway devices, and/or IoT devices. For example, the platform interfaces may cooperate with IoT back-end interfaces (e.g., IoT back-end interfaces 118), gateway device firmware (e.g., gateway firmware 510), and/or IoT device firmware (e.g., IoT firmware 420), to gather the IoT data over a communication network (e.g., communication network 108). In some embodiments, a communication engine (e.g., communication engine 219) may provide and/or facilitate communication over the communication network.

In step 604, the cloud-bot platform system stores the raw IoT data. In some embodiments, a management engine (e.g., management engine 202) stores the raw IoT data in a raw data datastore (e.g., raw data datastore 204).

In step 606, the cloud-bot platform system normalizes the raw IoT data to create normalized IoT data (e.g., normalized IoT data 222). For example, the cloud-bot platform system may normalize the raw IoT data based on a common model and/or common programming language (e.g., a domain-specified programming language). Accordingly, the normalized IoT data may have the same (or substantially similar) normalized data format(s) and/or normalized values/ranges. This may facilitate, for example, integration and/or evaluation of IoT data associated with disparate IoT devices (e.g., Nest IoT devices, Honeywell IoT devices, ADT Pulse IoT devices). In some embodiments, a data normalization engine (e.g., data normalization engine 216) normalizes the IoT data.

In step 608, the cloud-bot platform system stores the normalized IoT data. In some embodiments, the management engine stores the normalized IoT data in a normalized data datastore (e.g., normalized data datastore 206).

In various embodiments, some or all of the steps 602-608 to may be repeated (e.g., periodically, based on a schedule, in response to particular events). This may allow, for the example, the cloud-bot platform system to receive current IoT data (e.g., based on a schedule, on-demand, and/or in real-time).

In step 610, the cloud-bot platform system deploys a cloud-bot (e.g., cloud-bot 112). For example, the cloud-bot platform system may deploy the cloud-bot to a user account (e.g., user account of the cloud-bot platform system and/or related cloud-based system(s)). The cloud-bot platform system may deploy the cloud-bot in a particular mode (e.g., sleep mode or execute mode). In some embodiments, a cloud-bot deployment engine (e.g., cloud-bot deployment engine 218) deploys the cloud-bot.

In step 612, the cloud-bot triggers an execution of the cloud-bot based on one or more execution triggers. For example, the cloud-bot may listen for one or more execution triggers, and transition to an execute mode in response to one or more execution triggers. In some embodiments, a trigger engine (e.g., trigger engine 302) defines the execution triggers, and a cloud-bot execution engine (e.g., cloud-bot execution engine 304) triggers the execution of the cloud-bot.

In step 614, the cloud-bot loads one or more cloud-bot input values (e.g., cloud-bot variables 224). For example, the cloud-bot input values may include normalized IoT data associated with disparate IoT devices (e.g., Nest IoT devices, Honeywell IoT devices, ADT Pulse IoT devices) and/or cloud-bot variables (e.g., cloud-bot variables 224). The cloud-bot variables may allow the current execution of the cloud-bot to access data of prior executions of the cloud-bot (e.g., output/result data). In some embodiments, a cloud-bot processing engine (e.g., cloud-bot processing engine 306) loads the one or more cloud-bot input values.

For example, the cloud-bot processing engine may load the cloud-bot input values into a cloud-bot model of the cloud-bot.

In step 616, the cloud-bot evaluates the cloud-bot input values against a response condition of the cloud-bot. For example, a response condition may include a threshold score (e.g., a threshold score indicating a likelihood of mold growth). The cloud-bot may determine a current score based on the combination of input values. For example, the cloud-bot model may map relationships between the cloud-bot input values, and based on the mapped relationships, the cloud-bot may calculate the current score. The cloud-bot may compare the current score against the threshold score to determine whether the response condition is satisfied. In some embodiments, the cloud-bot processing engine performs the evaluation.

In step 618, the cloud-bot initiates one or more control actions and/or notification actions in response to satisfaction of the response condition. In some embodiments, the cloud-bot processing engine initiates the one or more control actions and/or notification actions. In some embodiments, the cloud-bot processing engine may cause communication between the cloud-bot platform system and one or more IoT devices and/or gateways, and/or may convert commands from normalized commands to device specific raw format commands.

In step 620, the cloud-bot exports a set of cloud-bot variables. For example, the cloud-bot may export state information. In some embodiments, the cloud-bot processing engine exports the cloud-bot variables.

In step 622, the cloud-bot terminates the execution of the cloud-bot. For example, the cloud-bot may transition to a sleep mode and/or otherwise quit/exit. The cloud-bot may terminate execution of the cloud-bot in response to one or more termination triggers (e.g., exported the cloud-bot variables and/or initiated the control/notification actions). In some embodiments, the cloud-bot execution engine and/or cloud-bot processing engine terminates the execution of the cloud-bot.

In various embodiments, some or all of the steps 612-622 may be repeated for subsequent executions of the cloud-bot. For example, the cloud-bot variables exported in step 622 may be used as input values for subsequent executions of the cloud-bot.

Figure 7:
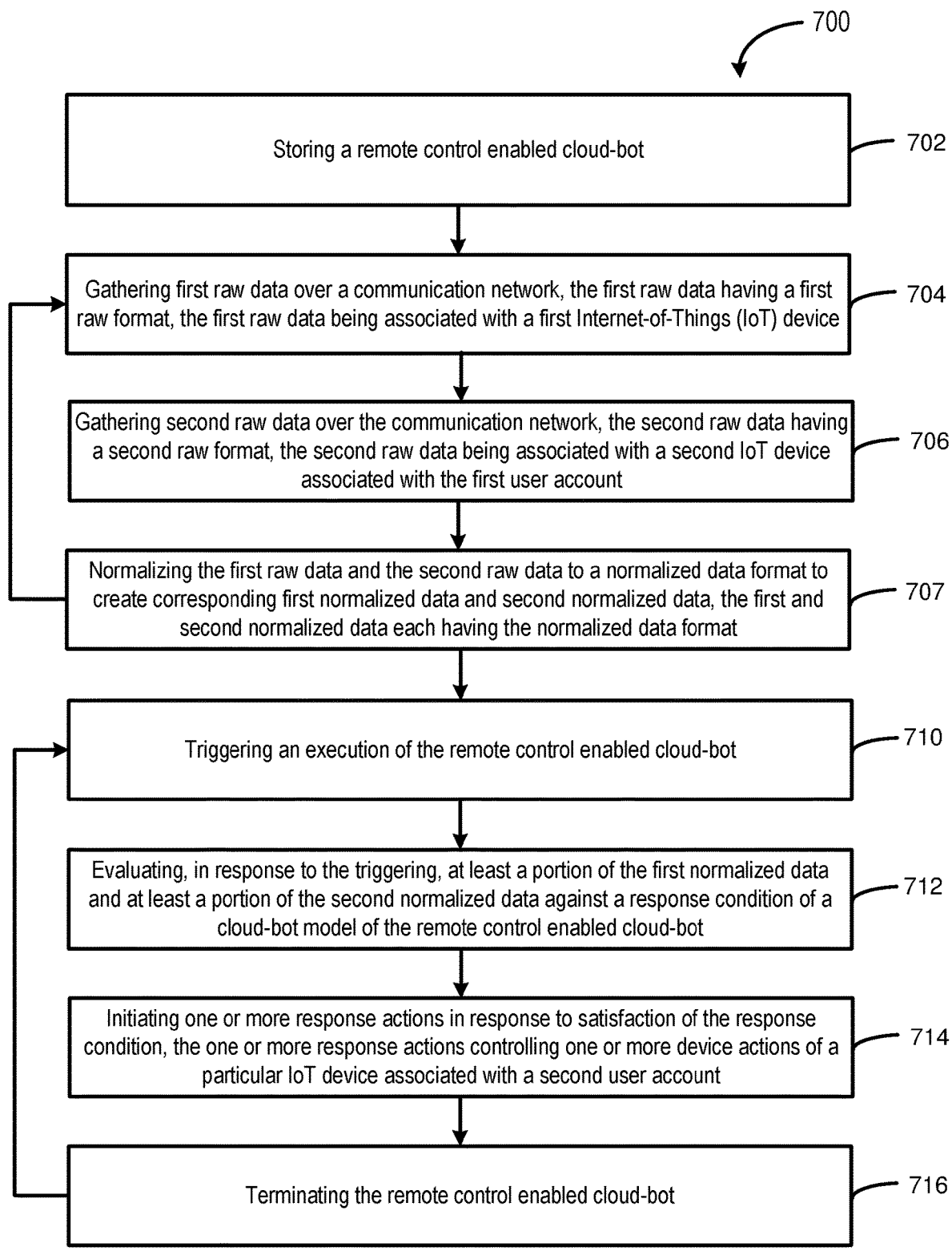
FIG. 7 depicts a flowchart of an example of a method of deployment and operation of a remote-control-enabled cloud-bot according to some embodiments.

FIG. 7 depicts a flowchart 700 of an example of a method of deployment and operation of a remote-control-enabled cloud-bot according to some embodiments. In some embodiments, a remote-control-enabled cloud-bot (e.g., a particular type of security cloud-bot 112) associated with a particular user may be capable controlling devices (e.g., IoT devices 116) of one or more other users (e.g., a neighbor) in addition to the devices (e.g., IoT devices 116) of the particular user.

In step 702, a cloud-based system (e.g., cloud-bot platform system 102) stores a remote-control-enabled cloud-bot (e.g., remote-control-enabled cloud-bots 112). In some embodiments, a management engine (e.g., management engine 202) stores the remote-control-enabled cloud-bot in a datastore (e.g., cloud-bot datastore 210).

In step 704, the cloud-based system gathers first raw data (e.g., raw motion sensor data 220) over a communication network (e.g., communication network 108). The first raw data may have a first raw format. The first raw data may be detected by a first IoT device (e.g., an ADT Pulse IoT device 116) associated with a first user account. For example, the first user account may be associated with a user network system deployed in the user's residence (e.g., user network system 104-1). In some embodiments, a data gathering engine (e.g., data gathering engine 214) gathers the first raw data.

In step 706, the cloud-based system gathers second raw data (e.g., raw smart lock data) over the communication network. The second raw data may have a second raw format (e.g., a Kwikset-specified data format). The second raw data may be detected by a second IoT device (e.g., a Kwikset IoT smart lock device 116) associated with the first user account. In some embodiments, the data gathering engine gathers the second raw data.

In step 708, the cloud-based system normalizes the first raw data and the second raw data to a normalized data format to create corresponding first normalized data and second normalized data. The first and second normalized data may each having the normalized data format. In some embodiments, a data normalization engine (e.g., data normalization engine 216) normalizes the first and second raw data.

In step 710, the remote-control-enabled cloud-bot triggers an execution of the remote-control-enabled cloud-bot. For example, the remote-control-enabled cloud-bot, while in a sleep mode or other non-executing mode, may listen for one or more execution triggers. The remote-control-enabled cloud-bot may trigger an execution in response to one or more of the execution triggers. In some embodiments, a cloud-bot execution engine (e.g., cloud-bot execution engine 304) triggers the execution.

In some embodiments, the cloud-bot platform system triggers the execution of the remote control-enabled cloud-bot. For example, a cloud-bot deployment engine (e.g., cloud-bot deployment engine 218) may trigger the execution.

In step 712, the remote-control-enabled cloud-bot evaluates at least a portion of the first normalized data and at least a portion of the second normalized data against a response condition of a cloud-bot model of the remote-control-enabled cloud-bot. In some embodiments, a cloud-bot model receives the at least a portion of the first normalized data as a first input and the at least a portion of the second normalized data as a second input. The cloud-bot model may identify a relationship between the first input and the second input, and may determine a satisfaction of the response condition based on the relationship. In some embodiments, a cloud-bot processing engine (e.g., cloud-bot processing engine 306) performs the evaluation.

In step 714, the remote-control-enabled cloud-bot initiates one or more response actions in response to satisfaction of the response condition. The one or more response actions may control one or more device actions of a particular IoT device associated with a second user account. For example, the second user account may be associated with a second user network system (e.g., user network system 104-2) deployed at the residence of the second user (e.g., the neighbor of the first user). The response action may instruct an IoT security camera device of the second user network located across the street from the first user's residence to activate. In some embodiments, the cloud-bot processing engine initiates the one or more response actions.

In step 716, the remote-control-enabled cloud-bot terminates execution of the remote-control-enabled cloud-bot (e.g., transitions to sleep mode). In some embodiments, the cloud-bot execution engine and/or cloud-bot processing engine terminates execution of the cloud-bot.

In some embodiments, the cloud-bot platform system terminates the execution of the remote control-enabled cloud-bot. For example, the cloud-bot deployment engine may trigger the execution.

Figure 8:
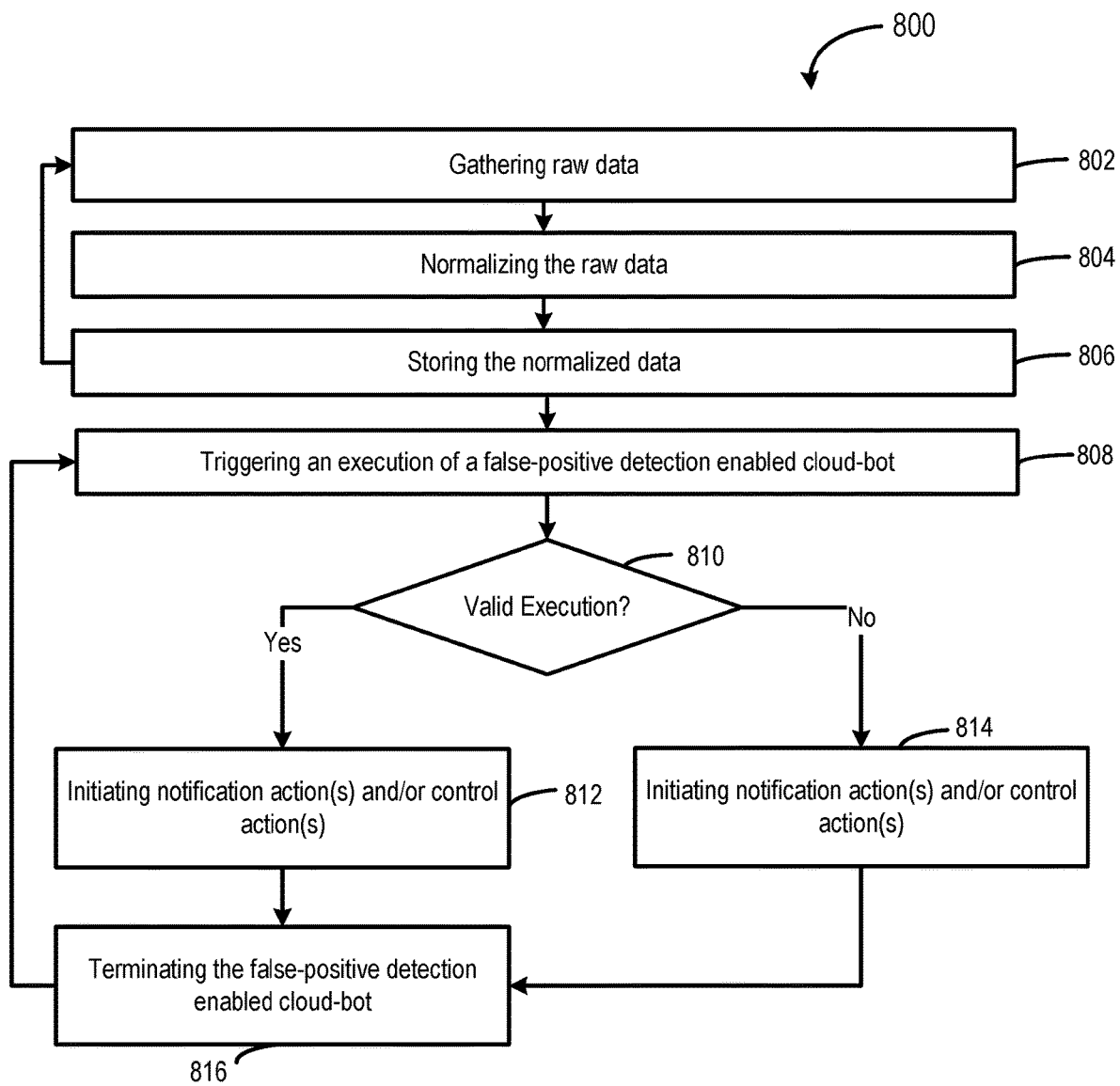
FIG. 8 depicts a flowchart of an example of a method of deployment and operation of a false-positive-detection cloud-bot according to some embodiments.

FIG. 8 depicts a flowchart 800 of an example of a method of deployment and operation of a false-positive-detection enabled cloud-bot according to some embodiments. In some embodiments, a false-positive-detection-enabled cloud-bot (e.g., a particular type of security cloud-bot 112) may be capable of distinguishing between valid and invalid execution triggers. For example, a door sensor may detect motion (e.g., door moves from a closed position towards an open position), but the false-positive-detection-enabled cloud-bot may prevent/terminate any alarm subsequently detects motion indicating that the door has returned to the closed position with a predetermined amount of time less than needed for a human to enter the home (e.g., 2 seconds). The false-positive-detection-enabled cloud-bot may terminate/prevent execution of the cloud-bot, may review other IoT data such as interior motion data for confirmation, and/or may change the schedule with which it performs evaluations.

In step 802, a cloud-based system (e.g., cloud-bot platform system 102) gathers raw data (e.g., raw IoT data 220) over a communication network (e.g., communication network 108). For example, the raw data may include motion data (e.g., opening/closing of a door, movement of individuals within a particular physical location). The raw data may have different data formats. The raw data may have been detected by one or more sensor engines (e.g., sensor engine 404) of one or more IoT devices (e.g., IoT devices 116). For example, the IoT devices may include IoT security devices and/or other types of IoT devices deployed in the same and/or different physical locations (e.g., a door/doorway, living room). In some embodiments, a data gathering engine (e.g., data gathering engine 214) gathers the raw data.

In step 804, the cloud-based system normalizes the raw data to a normalized data format to create normalized data. In some embodiments, a data normalization engine (e.g., data normalization engine 216) normalizes the raw data.

In step 806, the cloud-based system stores the normalized data. In some embodiments, a management engine (e.g., management engine 202) stores the normalized data in a normalized data datastore (e.g., normalized data datastore 206).

In various embodiments, some or all of the steps 802-806 may be repeated. Accordingly, the cloud-based system may gather, normalize, and store data continuously, periodically, on-demand, in real-time, and/or the like. In some embodiments, data may be timestamped and/or stored persistently. For example, the most recent data (e.g., as determined by respective timestamps) may be referred to as "current" data, while older data (e.g., as determined by respective timestamps) may be referred to as historical data.

In step 808, a cloud-bot (e.g., a false-positive-detection-enabled cloud-bot 112) triggers an execution of the cloud-bot. For example, while in a sleep mode or other non-executing mode, the cloud-bot may listen for an execution trigger (e.g., movement/motion of a door), and upon detection of the execution trigger, the cloud-bot may execute. In some embodiments, a cloud-bot execution engine (e.g., cloud-bot execution engine 304) triggers the execution of the cloud-bot.

In some embodiments, the cloud-bot platform system triggers the execution of the cloud-bot. For example, a cloud-bot deployment engine (e.g., cloud-bot deployment engine 218) may trigger the execution.

In step 810, the cloud-bot determines whether the execution of the cloud-bot is valid. In some embodiments, the cloud-bot may trigger a countdown timer (e.g., 2 seconds) and compare first timestamped normalized data associated with the start of the countdown timer with second timestamped normalized data associated with the end of the countdown timer. If the first timestamped normalized data indicates first information/state (e.g., door closed) different from a second information/state (e.g., door open) indicated by the second timestamped normalized data, the cloud-bot may determine the execution trigger is valid, and continue executing the cloud-bot, and initiate one or more notification and/or control actions (step 812). For example, the cloud-bot may cooperate with one or more associated IoT devices (e.g., an ADT IoT device) and/or function independently to notify a user or other entity (e.g., ADT), control an alarm, and so forth.

Otherwise, if the first timestamped normalized data indicates first information/state (e.g., door closed) that is the same as the second information/state (e.g., door closed) indicated by the second timestamped normalized data, the cloud-bot may determine the execution triggering is invalid (e.g., a false-positive). In various embodiments, a cloud-bot processing engine (e.g., cloud-bot processing engine 306) determines whether the execution of the cloud-bot is valid.

In step 814, the cloud-bot, in response to determining the triggering is invalid, initiates one or more control actions and/or notification actions. For example, the cloud-bot may provide a notification to a user indicating the presence of false-positive(s) that may enable the user to take remedial action (e.g., stabilizing the door). In some embodiments, the cloud-bot may require additional input values to determine a valid triggering in subsequent executions of the cloud-bot. For example, the current execution may only rely on an open door determination in order to initiate security control and/or notification actions (e.g., contact security entity, police, and/or the like), while subsequent executions after a false-positive determination may require data from other sensors (e.g., a sensor in the living room indicating motion) in order to initiate security control and/or notification actions. In some embodiments, the cloud-bot may trigger one or more other sensors or IoT devices. For example, the cloud-bot may turn on additional motion sensor(s) (e.g., a motion sensor in the living room) that were not active prior to determining a false positive.

In step 816, the cloud-bot terminates execution. In some embodiments, the cloud-bot processing engine terminates execution. In some embodiments, the cloud-bot platform system terminates the execution of the cloud-bot. For example, a cloud-bot deployment engine may terminates the execution.

Figure 9:
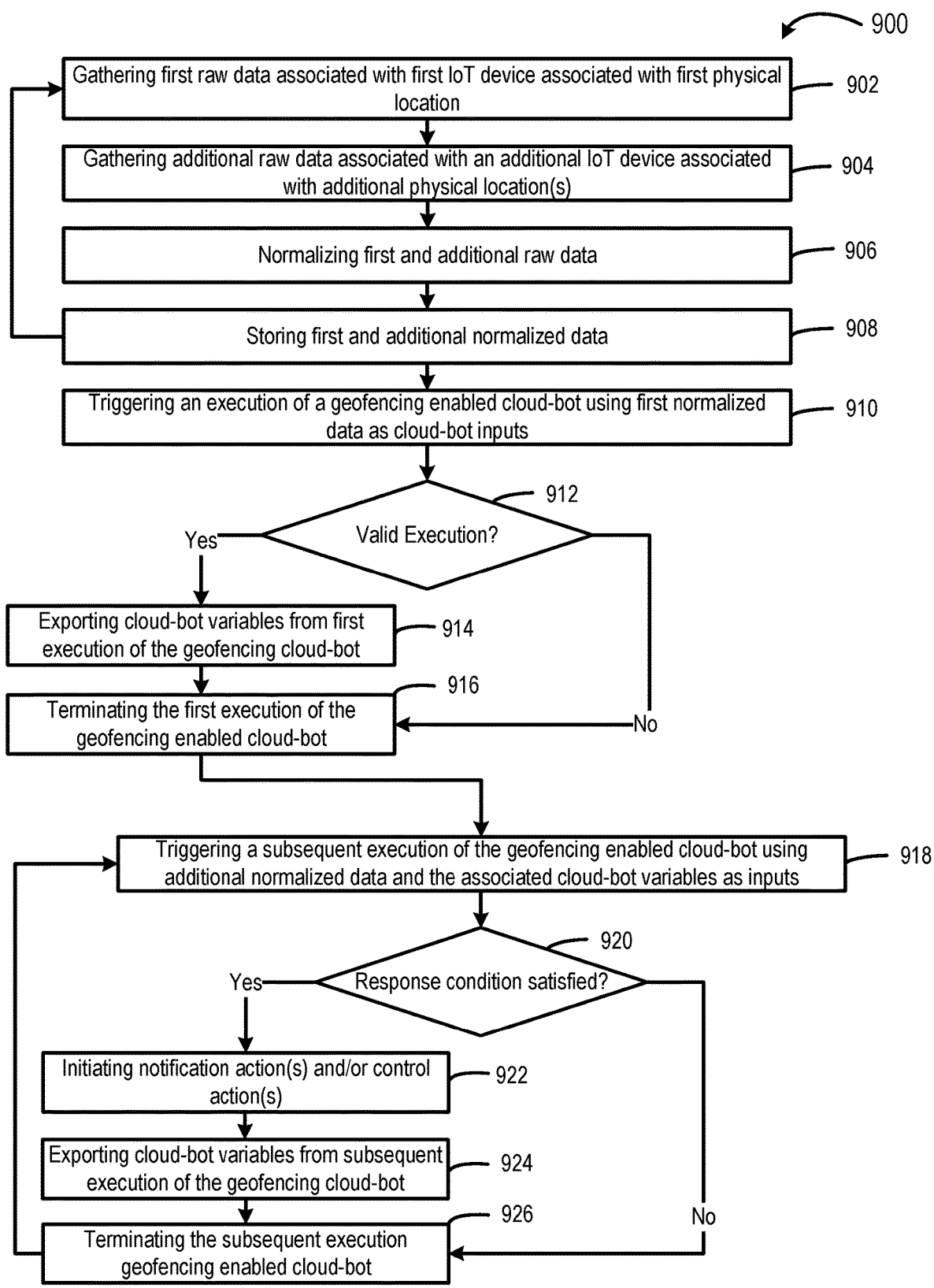
FIG. 9 depicts a flowchart of an example of a method of deployment and operation of a geofencing-enabled cloud-bot according to some embodiments.

FIG. 9 depicts a flowchart 900 of an example of a method of deployment and operation of a geofencing-enabled cloud-bot according to some embodiments. In some embodiments, geofencing-enabled cloud-bots may automatically determine presence and/or locations of geofencing subjects (e.g., humans, pets, etc.) without requiring smartphones and/or other mobile devices. For example, geofencing enabled cloud-bots may be used to arm a home security system when all geofencing subjects have left the home, adjust IoT thermostat devices based on a presence, or lack thereof, of particular geofencing subjects, and/or notify a user if a particular geofencing subject has moved outside of an expected location.

In step 902, a cloud-based system (e.g., cloud-bot platform system 102) gathers first raw IoT data (e.g., first raw IoT data 220) associated with a first IoT device (e.g., an IoT motion sensor device 116) associated with a first physical location (e.g., a door and/or doorway). For example, the first raw IoT data may include motion data (e.g., opening/closing of a door). The first raw IoT data may have been detected by one or more sensor engines (e.g., sensor engine 404) of the first IoT device. In some embodiments, a data gathering engine (e.g., data gathering engine 214) gathers the first raw IoT data.

In step 904, cloud-based system (e.g., cloud-bot platform system 102) gathers additional raw IoT data (e.g., additional raw IoT data 220) associated with an additional IoT device (e.g., an IoT camera device 116) associated with a second physical location (e.g., living room). For example, the additional raw IoT data may include image data (e.g., video of the living room). The additional raw IoT data may have been detected by one or more sensor engines (e.g., sensor engine 404) of the additional IoT device. In some embodiments, a data gathering engine (e.g., data gathering engine 214) gathers the additional raw IoT data.

In step 906, the cloud-based system normalizes the first and additional raw IoT data to a normalized data format to create first normalized data and additional normalized data having the same normalized data format. In some embodiments, a data normalization engine (e.g., data normalization engine 216) normalizes the first and additional raw IoT data.

In step 908, the cloud-based system stores the first and additional normalized data. In some embodiments, a management engine (e.g., management engine 202) stores the normalized data in a normalized data datastore (e.g., normalized data datastore 206).

In various embodiments, some or all of the steps 902-908 may be repeated. Accordingly, the cloud-based system may gather, normalize, and store data continuously, periodically, on-demand, in real-time, and/or the like. In some embodiments, the IoT data may be timestamped and/or stored persistently. For example, the most recent IoT data (e.g., as determined by respective timestamps) may be referred to as "current" IoT data, while older IoT data (e.g., as determined by respective timestamps) may be referred to as historical data.

In step 910, a cloud-bot (e.g., a geofencing-enabled cloud-bot 112) triggers an execution of the cloud-bot using the first normalized data as input for the cloud-bot. For example, while in a sleep mode or other non-executing mode, the cloud-bot may listen for an execution trigger (e.g., movement/motion of a door, user instruction, signal from other bot), and upon detection of the execution trigger, the cloud-bot may execute. In some embodiments, a cloud-bot execution engine (e.g., cloud-bot execution engine 304) triggers the execution of the cloud-bot.

In some embodiments, the cloud-bot platform system triggers the execution of the cloud-bot. For example, a cloud-bot deployment engine (e.g., cloud-bot deployment engine 218) may trigger the execution.

In step 912, the cloud-bot determines whether the execution of the cloud-bot is valid. In some embodiments, the cloud-bot may trigger a countdown timer (e.g., 2 seconds) and compare first timestamped normalized data of the first normalized data associated with the start of the countdown timer with second timestamped normalized data of the first normalized associated with the end of the countdown timer. If the first timestamped normalized data indicates first information/state (e.g., door closed) different from a second information/state (e.g., door open) indicated by the second timestamped normalized data, the cloud-bot may determine the execution trigger is valid, and export cloud-bot variables including the information/state (step 914), and terminate the first execution of the cloud-bot (step 916). In some embodiments, a cloud-bot processing engine (e.g., cloud-bot processing engine 306) determines whether the first execution of the cloud-bot is valid.

In step 918, the cloud-bot triggers a subsequent execution of the cloud-bot using the additional normalized data and the exported cloud-bot variables as inputs for the cloud-bot. For example, the subsequent execution of the cloud-bot may be caused by the previous execution of the cloud-bot. In some embodiments, a cloud-bot execution engine (e.g., cloud-bot execution engine 304) triggers the subsequent execution of the cloud-bot.

In some embodiments, the cloud-bot platform system triggers the execution of the subsequent execution of the cloud-bot. For example, the cloud-bot deployment engine may trigger the execution.

In step 916, the cloud-bot evaluates whether a response condition of the cloud-bot is satisfied. For example, if the cloud-bot variables indicate a valid door opening trigger (e.g., indicating someone left the home, and it was not a false-positive detection of door motion), and the additional normalized data indicates that the second physical location is not occupied (e.g., image data for a predetermined time window does not include an image of a person), the response condition may be satisfied (e.g., indicating that the home is empty). Alternatively, if the cloud-bot variables indicate a valid door opening event (e.g., indicating someone left the home, and it was not a false-positive detection of door motion), and the additional normalized data indicates that the second physical location is occupied (e.g., image data including an image of a person), the response condition may not be satisfied (e.g., indicating someone is still in the home). If the response condition is satisfied, the cloud-bot may initiate one or more notification and/or control actions (step 922), export cloud-bot variables (step 924), and terminate the subsequent execution of the cloud-bot (step 926).

For example, if the cloud-bot determines that the home is now empty, the cloud-bot may automatically arm a security system, and/or provide a notification to a user reminding the user to manually arm the security system. In some embodiments, the cloud-bot may have previously queried the user (e.g., "Would you like me to automatically arm your security system when I detect you've gone away?"), and based upon the user response (e.g., "Yes"), the cloud-bot may respond accordingly.

In some embodiments, the cloud-bots described herein are capable of learning, determining and/or being configured to recognize correlations/relationships between multiple sensors of a particular IoT device and/or multiple IoT devices. For example, if a first entry sensor closes and then a first motion sensor detects motion shortly thereafter, there may be a correlation (e.g., a causal relationship) between the two sensors (e.g., they may be in the same vicinity). For example, Bayesian Networks may be used to determined causal relationships. If a second entry sensor closes and then a second motion sensor detects motion activity, there may be a correlation between the second entry sensor and second motion sensor. This may allow, for example, the cloud-bot to refine the predetermined time window based on previous correlated measurements from sensors/devices.

In various embodiments, some or all of the step 918-926 may be repeated for any additional IoT devices. For example, additional IoT devices may be deployed in other physical locations (e.g., bedroom, dining room), which may also be used to evaluate whether the response condition is satisfied.

Figure 10:
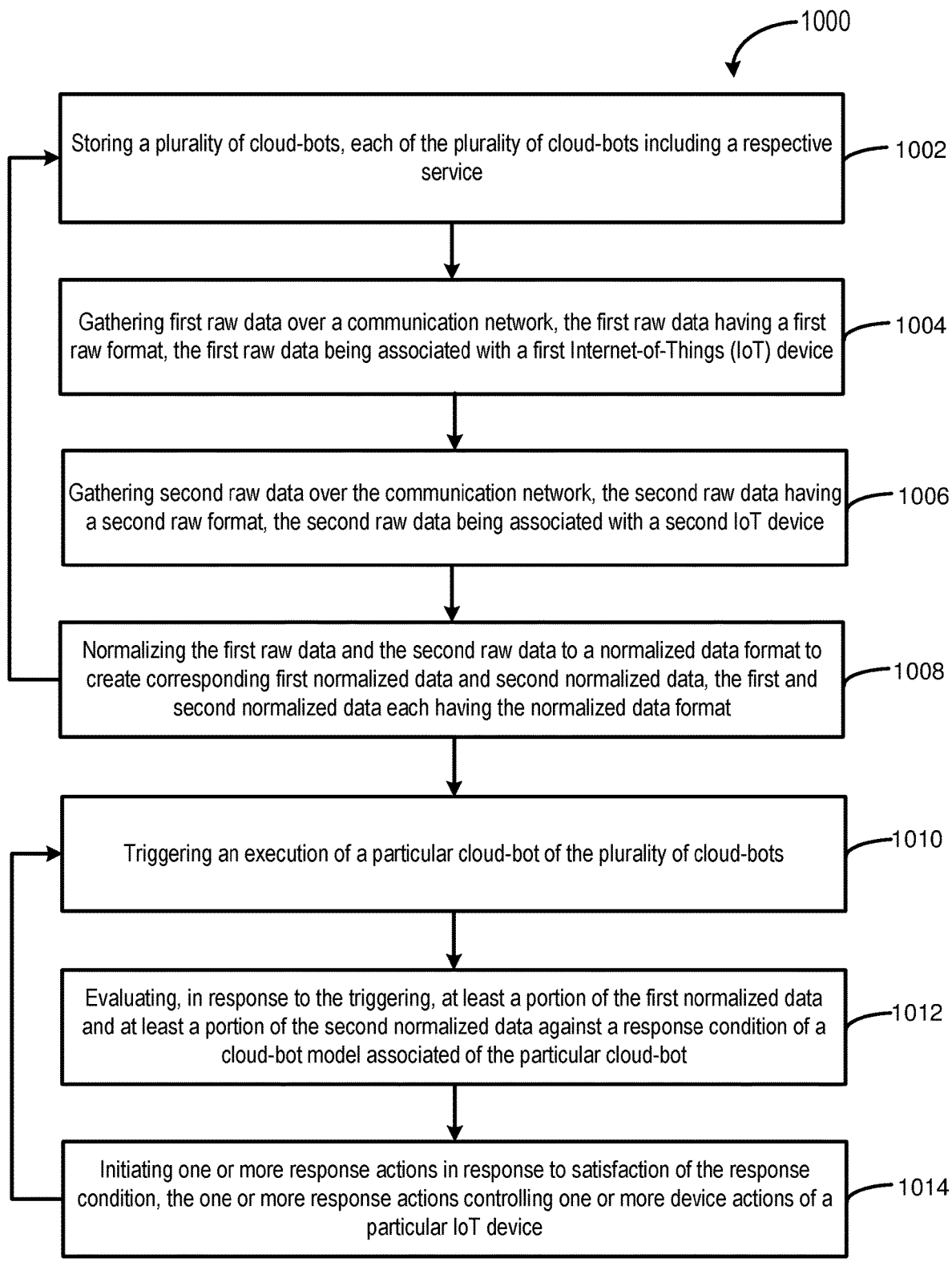
FIG. 10 depicts a flowchart of an example of a method of deployment and operation of a cloud-bot according to some embodiments.

FIG. 10 depicts a flowchart 1000 of an example of a method of deployment and operation of a cloud-bot according to some embodiments.

In step 1002, a cloud-based system (e.g., cloud-bot platform system 102) stores a plurality of cloud-bots (e.g., cloud-bots 112). Some or all of the plurality of cloud-bots may include a respective service. In some embodiments, a management engine (e.g., management engine 202) stores the cloud-bots in a datastore (e.g., cloud-bot datastore 210).

In step 1004, the cloud-based system gathers first raw IoT data (e.g., a first set of raw IoT data 220) over a communication network (e.g., communication network 108). The first raw IoT data may have a first raw format (e.g., a Nest-specified data format). The first raw IoT data may be associated with a first Internet-of-Things (IoT) device (e.g., a Nest IoT thermostat device). In some embodiments, a data gathering engine (e.g., data gathering engine 214) gathers the first raw IoT data.

In step 1006, the cloud-based system gathers second raw IoT data (e.g., a second set of raw IoT data 220) over the communication network. The second raw IoT data may have a second raw format (e.g., a Honeywell-specified data format). The second raw IoT data may be associated with a second IoT device (e.g., a Honeywell IoT humidity device). In some embodiments, the data gathering engine gathers the second raw IoT data.

In step 1008, the cloud-based system normalizes the first raw IoT data and the second raw IoT data to a normalized data format to create corresponding first normalized data and second normalized data. The first and second normalized data may each having the normalized data format. In some embodiments, a data normalization engine (e.g., data normalization engine 216) normalizes the first and second raw IoT data.

In step 1010, a particular cloud-bot of the plurality of cloud-bots triggers an execution of the particular cloud-bot. In some embodiments, a cloud-bot execution engine (e.g., cloud-bot execution engine 304) triggers the execution of the particular cloud-bot. In other embodiments, the cloud-based system triggers the particular cloud-bot. For example, the cloud-bot deployment engine 218 may trigger the execution of the particular cloud-bot in response to one or more execution triggers, described elsewhere herein.

In some embodiments, the cloud-based system triggers execution of the particular cloud-bot. For example, a deployment engine (e.g., cloud-bot deployment engine 218)

In step 1012, the particular cloud-bot evaluates at least a portion of the first normalized data and at least a portion of the second normalized data against a response condition of a cloud-bot model of the particular cloud-bot. In some embodiments, a cloud-bot model receives the at least a portion of the first normalized data as a first input and the at least a portion of the second normalized data as a second input. The cloud-bot model may identify a relationship between the first input and the second input, which may cause a satisfaction of the response condition. In some embodiments, a cloud-bot processing engine (e.g., cloud-bot processing engine 306) performs the evaluation.

In step 1014, the particular cloud-bot initiates one or more response actions in response to satisfaction of the response condition, the one or more response actions controlling one or more device actions of a particular IoT device. The particular IoT device may be the first IoT device, the second IoT device, or another IoT device. In some embodiments, the cloud-bot processing engine initiates the one or more response actions.

In step 1016, the particular cloud-bot terminates execution of the cloud-bot (e.g., transitions to sleep mode). In some embodiments, the cloud-bot execution engine and/or cloud-bot processing engine terminates execution of the cloud-bot.

Figure 11:
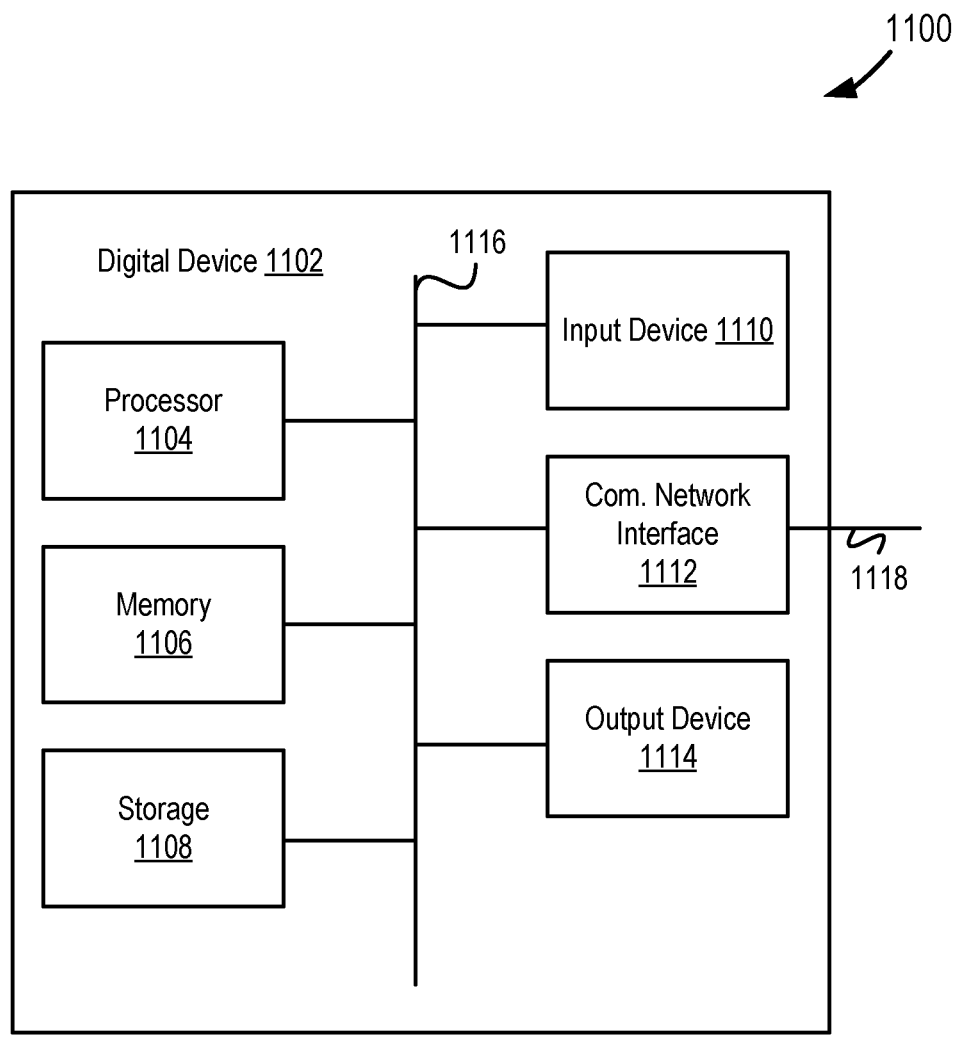
FIG. 11 is a diagram of an example computer system for implementing the features disclosed herein.

FIG. 11 depicts a diagram 1100 of an example of a computing device 1102. Any of the cloud-bot platform systems 102, the user network systems 104, the IoT back-end systems, and the communication network 108 may comprise an instance of one or more computing devices 1102. The computing device 1102 comprises a processor 1104, memory 1106, storage 1108, an input device 1110, a communication network interface 1112, and an output device 1114 communicatively coupled to a communication channel 1116. The processor 1104 is configured to execute executable instructions (e.g., programs). In some embodiments, the processor 1104 comprises circuitry or any processor capable of processing the executable instructions.

The memory 1106 stores data. Some examples of memory 1106 include storage devices, such as RAM, ROM, RAM cache, virtual memory, etc. In various embodiments, working data is stored within the memory 1106. The data within the memory 1106 may be cleared or ultimately transferred to the storage 1108.

The storage 1108 includes any storage configured to retrieve and store data. Some examples of the storage 1108 include flash drives, hard drives, optical drives, cloud storage, and/or magnetic tape. Each of the memory system 1106 and the storage system 1108 comprises a computer-readable medium, which stores instructions or programs executable by processor 1104.

The input device 1110 is any device that inputs data (e.g., mouse and keyboard). The output device 1114 outputs data (e.g., a speaker or display). It will be appreciated that the storage 1108, input device 1110, and output device 1114 may be optional. For example, the routers/switchers may comprise the processor 1104 and memory 1106 as well as a device to receive and output data (e.g., the communication network interface 1112 and/or the output device 1114).

The communication network interface 1112 may be coupled to a network (e.g., network 108) via the link 1118. The communication network interface 1112 may support communication over an Ethernet connection, a serial connection, a parallel connection, and/or an ATA connection. The communication network interface 1112 may also support wireless communication (e.g., 802.11 a/b/g/n, WiMax, LTE, WiFi). It will be apparent that the communication network interface 1112 may support many wired and wireless standards.

It will be appreciated that the hardware elements of the computing device 1102 are not limited to those depicted in FIG. 11. A computing device 1102 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1104 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for IoT back-ends, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:
1. A computing system comprising:
one or more processors; and
memory storing instructions that, when executed by the one or more processors, cause the computing system to perform:
storing, by a cloud-based system, a plurality of cloud-bots, each of the plurality of cloud-bots including a respective service, each of the cloud-bots being selectable to support one or more user accounts;
receiving selection of a set of particular cloud-bots of the plurality of cloud-bots for a particular user account of the one or more user accounts, one particular cloud-bot of the set of particular cloud-bots having a sleep state and an execution state;
for the particular user account,
gathering, by the cloud-based system, first data over a communication network, the first data being associated with a first Internet-of-Things (IoT) device, the first IoT device being associated with the particular user account, the first data being received from a first cloud-based IoT back-end system associated with and remote from the first IoT device;
gathering, by the cloud-based system, second data over the communication network, the second data being associated with a second IoT device, the second IoT device being associated with the particular user account, the second IoT device being different than the first IoT device, the second data being received from a second cloud-based IoT back-end system associated with and remote from the second IoT device, the first cloud-based IoT back-end system being different than the second cloud-based IoT back-end system;
monitoring the first data and the second data to determine whether satisfaction of a trigger condition associated with the one particular cloud-bot of the set of particular cloud-bots has occurred:
upon satisfaction of h trigger condition, causing execution of the one particular cloud-bot of the set of particular cloud-bots, the execution of the one particular cloud-bot causing the one particular cloud-bot to transition from the sleep state to the execution state, the one particular cloud-bot having a particular cloud-bot model, the particular cloud-bot model defining a response condition, the response condition being based on a likelihood of an event having happened or expected to happen;
evaluating, by the one particular cloud-bot of the plurality of particular cloud-bots, at least the first data and the second data against the response condition of the particular cloud-bot model of the one particular cloud-bot;
initiating, by the one particular cloud-bot of the plurality of particular cloud-bots, one or more response actions in response to satisfaction of the response condition, the one or more response actions controlling one or more device actions of a particular IoT device; and
upon satisfaction of a sleep condition, transitioning the one particular cloud-bot of the set of particular cloud-bots to the sleep state.

2. The system of claim 1, wherein the first IoT device is associated with a first manufacturer entity, and the second IoT device is associated with a second manufacturer entity different from the first manufacturer entity.

3. The system of claim 2, wherein the first cloud-based IoT back-end system is associated with the first manufacturer entity, and the second cloud-based IoT back-end system is associated with the second manufacturer entity.

4. The system of claim 1, wherein the particular IoT device comprises the first IoT device or the second IoT device.

5. The system of claim 1, wherein the particular IoT device is different from the first IoT device and the second IoT device.

6. The system of claim 1, wherein the one particular cloud-bot model receives the first data as a first input and the second data as a second input, the one particular cloud-bot model identifying a relationship between the first input and the second input, the relationship causing a satisfaction of the response condition.

7. The system of claim 1, wherein the combination of the first data and the second data is sufficient to satisfy the response condition, wherein independently the at least a portion of the first data and the at least a portion of the second data fail to satisfy the response trigger condition.

8. The system of claim 1, wherein the first IoT device and the second IoT device belong to a user of the particular user account, and the particular IoT device is a control device of a user of a different user account.

9. The system of claim 1, wherein the one particular cloud-bot is configured to monitor for false positives of a door sensor.

10. The system of claim 1, wherein the response condition includes a factor based on a phoneless geofence.

11. A method being implemented by a computing system including one or more physical processors and storage media storing machine-readable instructions, the method comprising:

storing, by a cloud-based system, a plurality of cloud-bots, each of the plurality of cloud-bots including a respective service, each of the cloud-bots being selectable to support one or more user accounts;

receiving selection of a set of particular cloud-bots of the plurality of cloud-bots for a particular user account of the one or more user accounts, one particular cloud-bot of the set of particular cloud-bots having a sleep state and an execution state;

for the particular user account,
    gathering, by the cloud-based system, first data over a communication network, the first data being associated with a first Internet-of-Things (IoT) device, the first IoT device being associated with the particular user account, the first data being received from a first cloud-based IoT back-end system associated with and remote from the first IoT device;
    gathering, by the cloud-based system, second data over the communication network, the second data being associated with a second IoT device, the second IoT device being associated with the particular user account, the second IoT device being different than the first IoT device, the second data being received from a second cloud-based IoT back-end system associated with and remote from the second IoT device, the first cloud-based IoT back-end system being different than the second cloud-based IoT back-end system;
    monitoring the first data and the second data to determine whether satisfaction of a trigger condition associated with the one particular cloud-bot of the set of particular cloud-bots has occurred;
    upon satisfaction of the trigger condition, causing execution of the one particular cloud-bot of the set of particular cloud-bots, the execution of the one particular cloud-bot causing the one particular cloud-bot to transition from the sleep state to the execution state, the one particular cloud-bot having a particular cloud-bot model, the particular cloud-bot model defining a response condition, the response condition being based on a likelihood of an event having happened or expected to happen;
    evaluating, by the one particular cloud-bot of the plurality of particular cloud-bots, at least the first data and the second data against the response condition of the particular cloud-bot model of the one particular cloud-bot;
    initiating, by the one particular cloud-bot of the plurality of particular cloud-bots, one or more response actions in response to satisfaction of the response condition, the one or more response actions controlling one or more device actions of a particular IoT device; and
    upon satisfaction of a sleep condition, transitioning the one particular cloud-bot of the set of particular cloud-bots to the sleep state.

12. The method of claim 11, wherein the first IoT device is associated with a first manufacturer entity; and the second IoT device is associated with a second manufacturer entity different from the first manufacturer entity.

13. The method of claim 12, wherein the first cloud-based IoT back-end system is associated with the first manufacturer entity, and the second cloud-based IoT back-end system is associated with the second manufacturer entity.

14. The method of claim 11, wherein the particular IoT device comprises the first IoT device or the second IoT device.

15. The method of claim 11, wherein the particular IoT device is different from the first IoT device and the second IoT device.

16. The method of claim 11, wherein the one particular cloud-bot model receives the first data as a first input and the second data as a second input, the one particular cloud-bot model identifying a relationship between the first input and the second input, the relationship causing a satisfaction of the response condition.

17. The method of claim 11, wherein the combination of the first data and the second data is sufficient to satisfy the response condition, wherein independently the at least a portion of the first data and the at least a portion of the second data fail to satisfy the response trigger condition.

18. The method of claim 11, wherein the first IoT device and the second IoT device belong to a user of the particular user account, and the particular IoT device is a control device of a user of a different user account.

19. The method of claim 11, wherein the evaluating includes monitoring for false positives of a door sensor.

20. The method of claim 11, wherein the response condition includes a factor based on a phoneless geofence.

* * * * *

UNITED STATES PATENT AND TRADEMARK OFFICE
CERTIFICATE OF CORRECTION

PATENT NO. : 10,976,714 B2
APPLICATION NO. : 15/666494
DATED : April 13, 2021
INVENTOR(S) : Moss et al.

Page 1 of 1

It is certified that error appears in the above-identified patent and that said Letters Patent is hereby corrected as shown below:

In the Claims

Claim 1, Column 24, Line 38:
"upon satisfaction of h trigger condition, causing"
Should read:
--upon satisfaction of the trigger condition, causing--

Signed and Sealed this
First Day of June, 2021

Drew Hirshfeld
*Performing the Functions and Duties of the
Under Secretary of Commerce for Intellectual Property and
Director of the United States Patent and Trademark Office*